US012726682B1

(12) United States Patent
Lal et al.

(10) Patent No.: US 12,726,682 B1
(45) Date of Patent: Sep. 1, 2026

(54) METHODS AND SYSTEMS FOR IMPROVING USER ENGAGEMENT WITH CONTENT VIA AN ADAPTABLE INTERACTIVE ELEMENT

(71) Applicant: Adeia Guides Inc., San Jose, CA (US)

(72) Inventors: Dhananjay Lal, Englewood, CO (US); Aldis Sipolins, Somerville, MA (US); Jean-Yves Couleaud, Mission Viejo, CA (US); Ning Xu, Irvine, CA (US); Serhad Doken, Bryn Mawr, PA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 19/093,935

(22) Filed: Mar. 28, 2025

(51) Int. Cl.
*H04N 21/4725* (2011.01)
*G06F 3/04817* (2022.01)
*H04N 21/431* (2011.01)
*G06Q 30/0241* (2023.01)

(52) U.S. Cl.
CPC ..... *H04N 21/4725* (2013.01); *G06F 3/04817* (2013.01); *H04N 21/431* (2013.01); *G06Q 30/0241* (2013.01)

(58) Field of Classification Search
None
See application file for complete search history.

(56) References Cited

U.S. PATENT DOCUMENTS 5,727,141 A * 3/1998 Hoddie ............ H04N 21/43072 345/475
11,617,017 B2 * 3/2023 Gupta ................ H04N 21/8543 725/32
12,155,897 B2 * 11/2024 Bloch ................. G11B 27/102
2005/0105888 A1 * 5/2005 Hamada .................. H04N 9/64 386/230
2005/0152682 A1 * 7/2005 Kang .................. H04N 21/431 386/230
2006/0089843 A1 * 4/2006 Flather .................. G06Q 30/06 705/1.1

(Continued)

FOREIGN PATENT DOCUMENTS

WO WO-0193161 A1 * 12/2001 ....... H04N 21/44224
WO WO-2015030607 A1 * 3/2015 ........... G06F 3/0482
WO WO-2016171351 A1 * 10/2016 ......... H04N 21/4722

OTHER PUBLICATIONS

"Adjusting skip button location ( HTML )," available online at: https://groups.google.com/g/ima-sdk/c/VtdLy_b9J_w?pli=1, retrieved on May 2, 2025, 12 pages.
"Can we change css on skip ad button for video ads? In mobile skip button is getting out of frame," available online at: <https://support.google.com/admanager/thread/105334417/can-we-change-css-on-skip-ad-button-for-video-ads-in-mobile-skip-button-is-getting-out-of-frame?hl=en>, Apr. 7, 2021, 7 pages.

(Continued)

*Primary Examiner* — William J Kim
(74) *Attorney, Agent, or Firm* — HG LAW LLP

(57) ABSTRACT

Methods and systems are disclosed herein for enabling an improved management of a buffer resource of the device during a presentation of a content item, by improving user engagement with content via an adaptable interactive element. A first content item is caused, at a device, to be generated for presentation. Positional data defining a position of an interactive element when presented on the device is determined, wherein the positional data associates the position of the interactive element with a position of a content element presented in the first content item. The interactive element is caused, at the device, to be generated for presentation at a first position based on the positional data.

18 Claims, 19 Drawing Sheets

(56) References Cited

U.S. PATENT DOCUMENTS

| | | | | |
|---|---|---|---|---|
| 2006/0136967 | A1* | 6/2006 | Hellman | H04N 21/4532 725/62 |
| 2008/0134097 | A1* | 6/2008 | Uchimura | G11B 27/32 707/999.102 |
| 2014/0298220 | A1* | 10/2014 | Luu | G06F 3/04845 715/765 |
| 2015/0067723 | A1* | 3/2015 | Bloch | H04N 21/4325 725/32 |
| 2017/0032562 | A1* | 2/2017 | Block | H04N 21/4316 |
| 2022/0404956 | A1* | 12/2022 | Choi | G06F 3/0482 |
| 2023/0110586 | A1* | 4/2023 | Robert Jose | H04N 21/458 725/10 |
| 2023/0269424 | A1* | 8/2023 | Robert Jose | H04N 21/47217 725/10 |

OTHER PUBLICATIONS

Dukes et al., “Interactive Advertising: The Case of Skippable Ads”, SSRN Electronic Journal, Mar. 31, 2019, 39 pages.

Gao et al., “Visual Saliency Models for Text Detection in Real World”, Plos One, vol. 9, No. 12, Dec. 10, 2014, 20 pages.

Google Dynamic Ad Insertion, Request DAI VOD streams, available online at: <https://developers.google.com/ad-manager/dynamic-ad-insertion/api/full-service/video-player-vod>, retrieved on May 1, 2025, 4 pages.

Szczepankiewicz et al., “Ground truth based comparison of saliency maps algorithms”, Scientific Reports, vol. 13, 2023, 14 pages.

What is Saliency Map?, available online at: <https://www.geeksforgeeks.org/what-is-saliency-map/>, Oct. 29, 2021, 7 pages.

* cited by examiner

100B
Server
116
118
OR
1
2
116
Local storage
118
102
113
104a
120
112
108
+
110
icon
113
104
110
icon
122
112
108
113
104
110
icon
112
108
106a
106
102
124

Figure 1C:
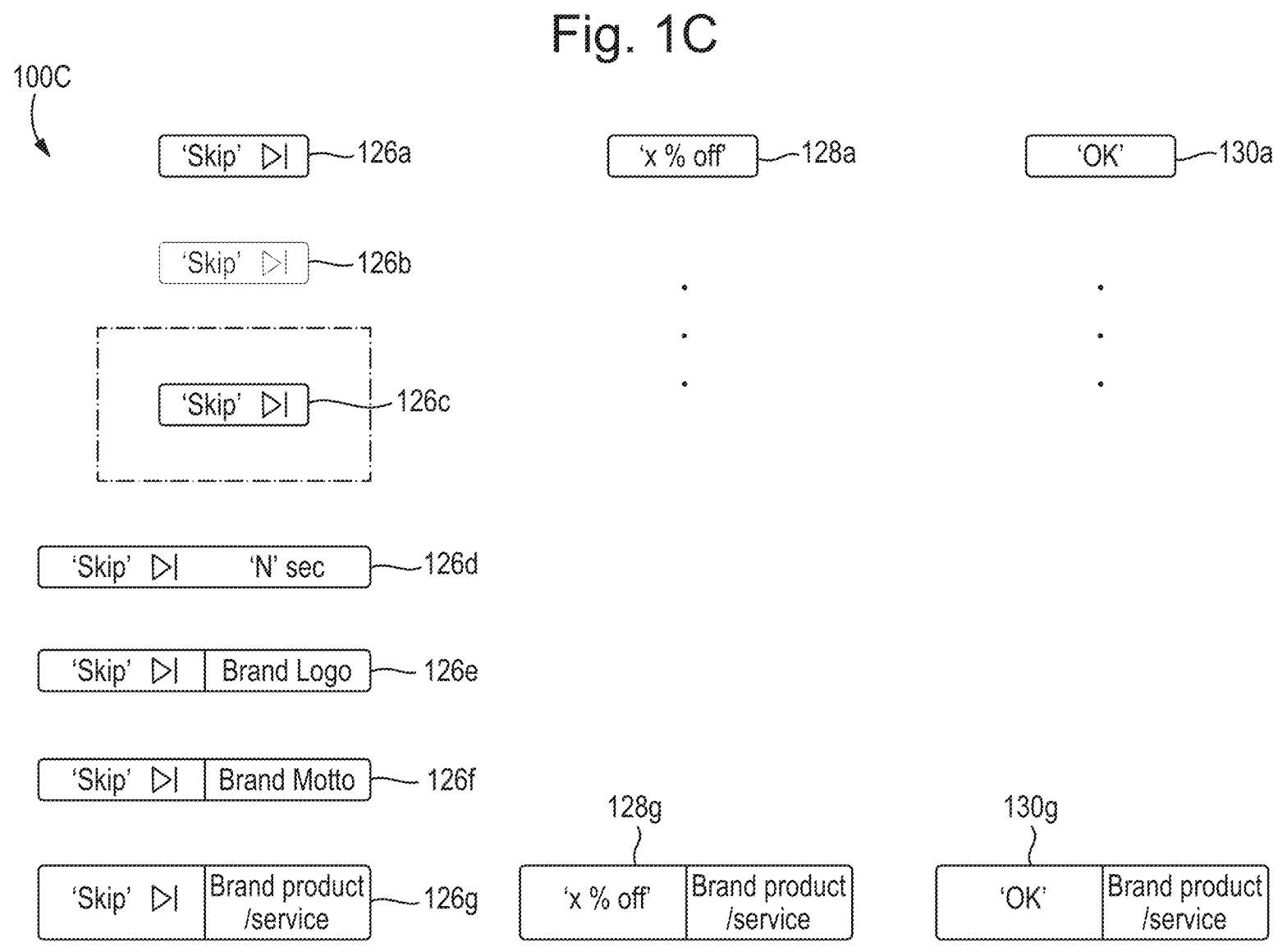

'Skip' ▷| 126a

'Skip' ▷| 126b

'Skip' ▷| 126c

'Skip' ▷| 'N' sec 126d

'Skip' ▷| Brand Logo 126e

'Skip' ▷| Brand Motto 126f

'Skip' ▷| Brand product /service 126g

'x % off' 128a

. . .

'x % off' Brand product /service 128g

'OK' 130a

. . .

'OK' Brand product /service 130g

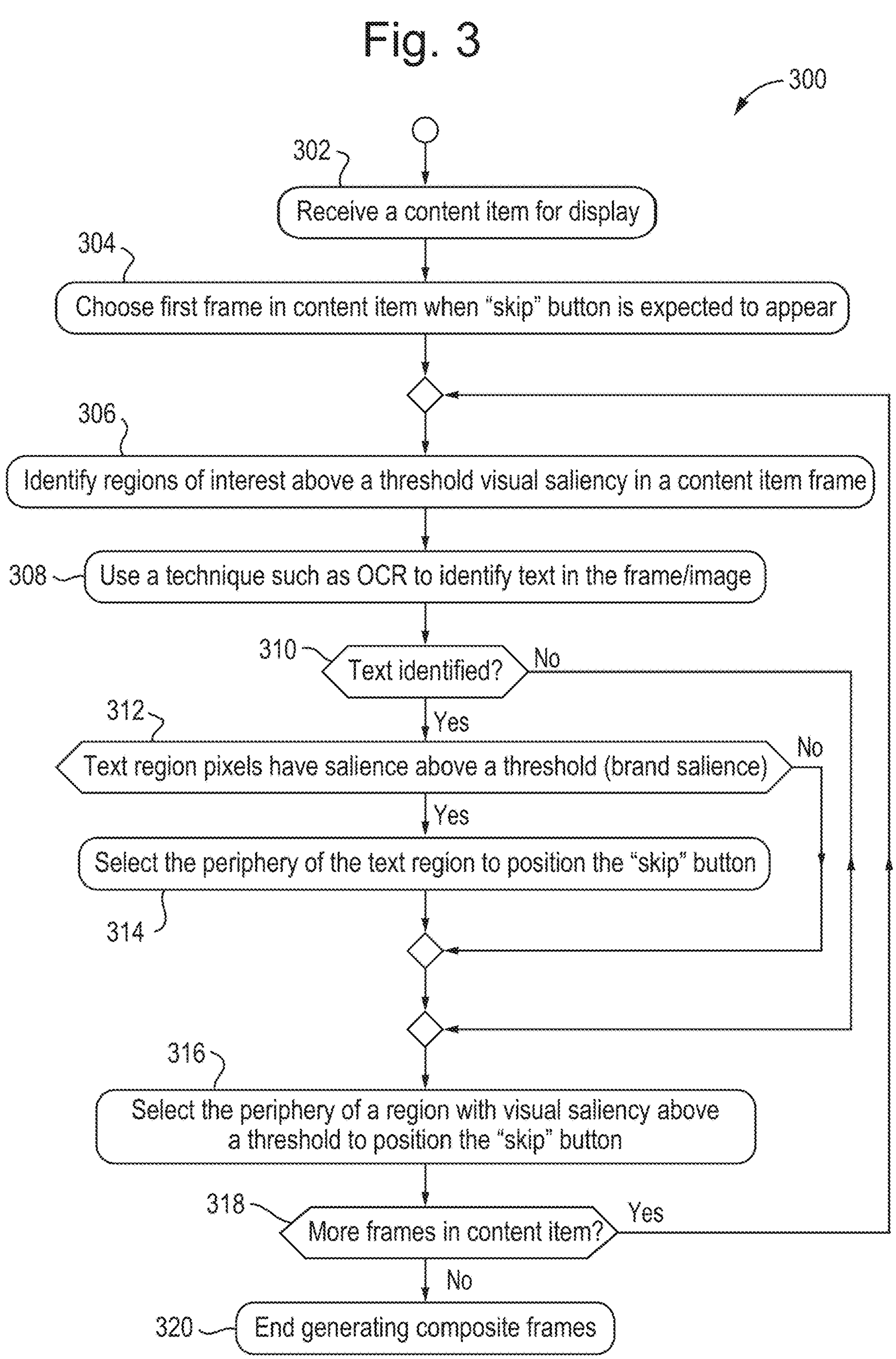

Fig. 3
300
302
Receive a content item for display
304
Choose first frame in content item when “skip” button is expected to appear
306
Identify regions of interest above a threshold visual saliency in a content item frame
308
Use a technique such as OCR to identify text in the frame/image
310
Text identified?
No
Yes
312
Text region pixels have salience above a threshold (brand salience)
No
Yes
Select the periphery of the text region to position the “skip” button
314
316
Select the periphery of a region with visual saliency above a threshold to position the “skip” button
318
More frames in content item?
Yes
No
320
End generating composite frames 400
402a
402b
404a
404b
406a
406b

Figure 5:
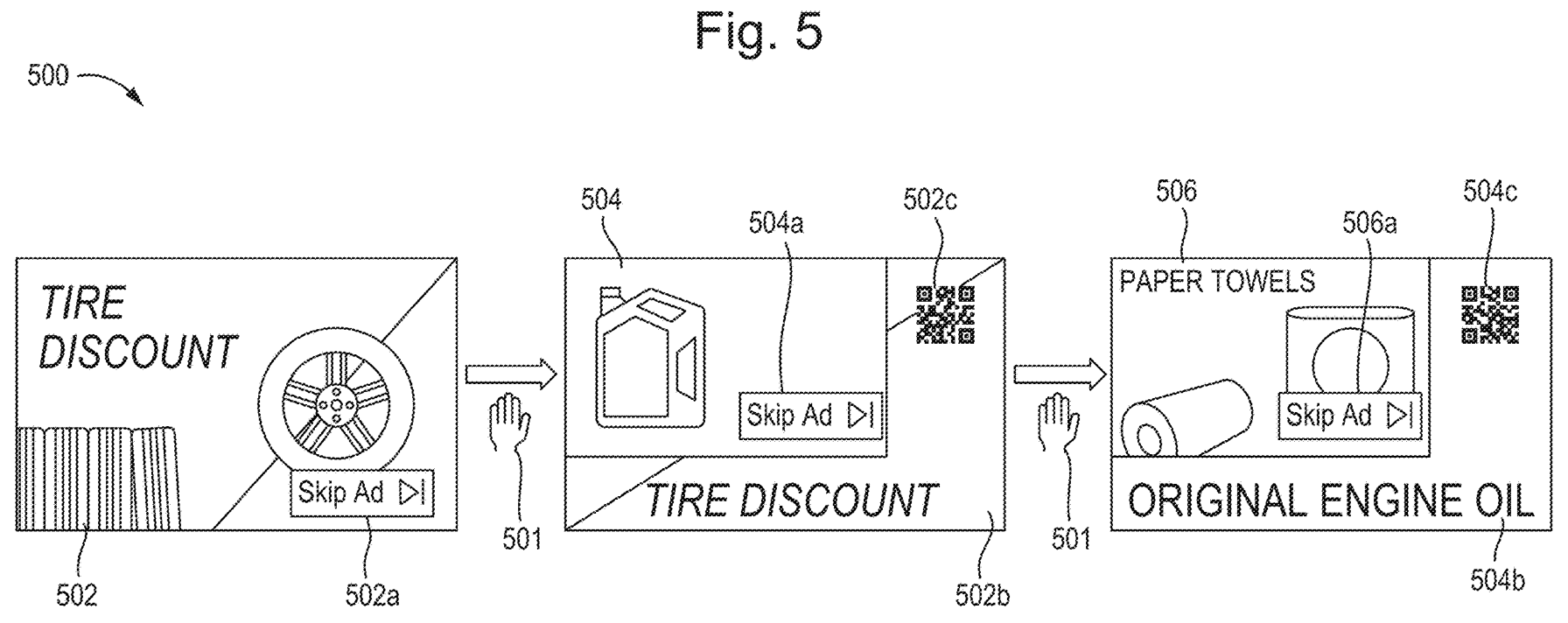

TIRE DISCOUNT

Skip Ad 502 502a

501

504 504a 502c 502b

Skip Ad

TIRE DISCOUNT

501

506 506a 504c 504b

PAPER TOWELS

Skip Ad

ORIGINAL ENGINE OIL 601
600C
Automatic Skip Ad 'TM'
'Skip'
608C
604
New 'TM' Car with novel DSG
Automatically changes gears and skips ads for you.
602C
606
Advertisement (0:04)
0:00 / 6:55

601
600D
Automatic Skip Ad 'TM'
604
New 'TM' Car with novel DSG
Automatically changes gears and skips ads for you.
602D
606
'Skip'
608D
Advertisement (0:04)
0:00 / 6:55

601
600E
Automatic Skip Ad 'TM'
604
New 'TM' Car with novel DSG
Automatically changes gears and skips ads for you.
602E
608E
'Skip'
606
Advertisement (0:04)
0:00 / 6:55

900
902
906a
906b
Skip Ad
Send to phone 7
904a
904b
907
Select 'Skip ad'
908
Ad 0:15
912a
912b
Learn more by scanning or sending to your phone
Send to phone
910a
Skip Ad
906b
904a
904b 1000
1002
'Drink A'
'Drink A'
1004
SCAN TO ORDER ON DRIZLY
'Drink A'
1003
PRESS OK TO DISCOVER 'Drink A' COCKTAIL RECIPES
1006
Select 'OK'
1008
1002
1004
'Drink A'
Cocktail recipes
'Drink A'
'Drink A'
SCAN TO ORDER ON DRIZLY
Skip Ad
'Drink A'
1003
PRESS OK TO DISCOVER 'Drink A' COCKTAIL RECIPES
1010

Boots - brand 'A'

NOW $125.99

SHOP NOW

1106

1108

Select 'Shop now'

1110

Product Description $125.99

BUY

'Skip'

1112

1200
Server
1204
I/O
Path
1212
Control Circuitry
1210
Processing
Circuitry
1216
Storage
1214
Communication
Network(s)
1208
Content
Database
1206
Computing Device
1202
Control Circuitry
1218
Storage
1228
Processing
Circuitry
1230
I/O
Path
1220
Speaker
1222
Display
1224
User
Input
Interface
1226

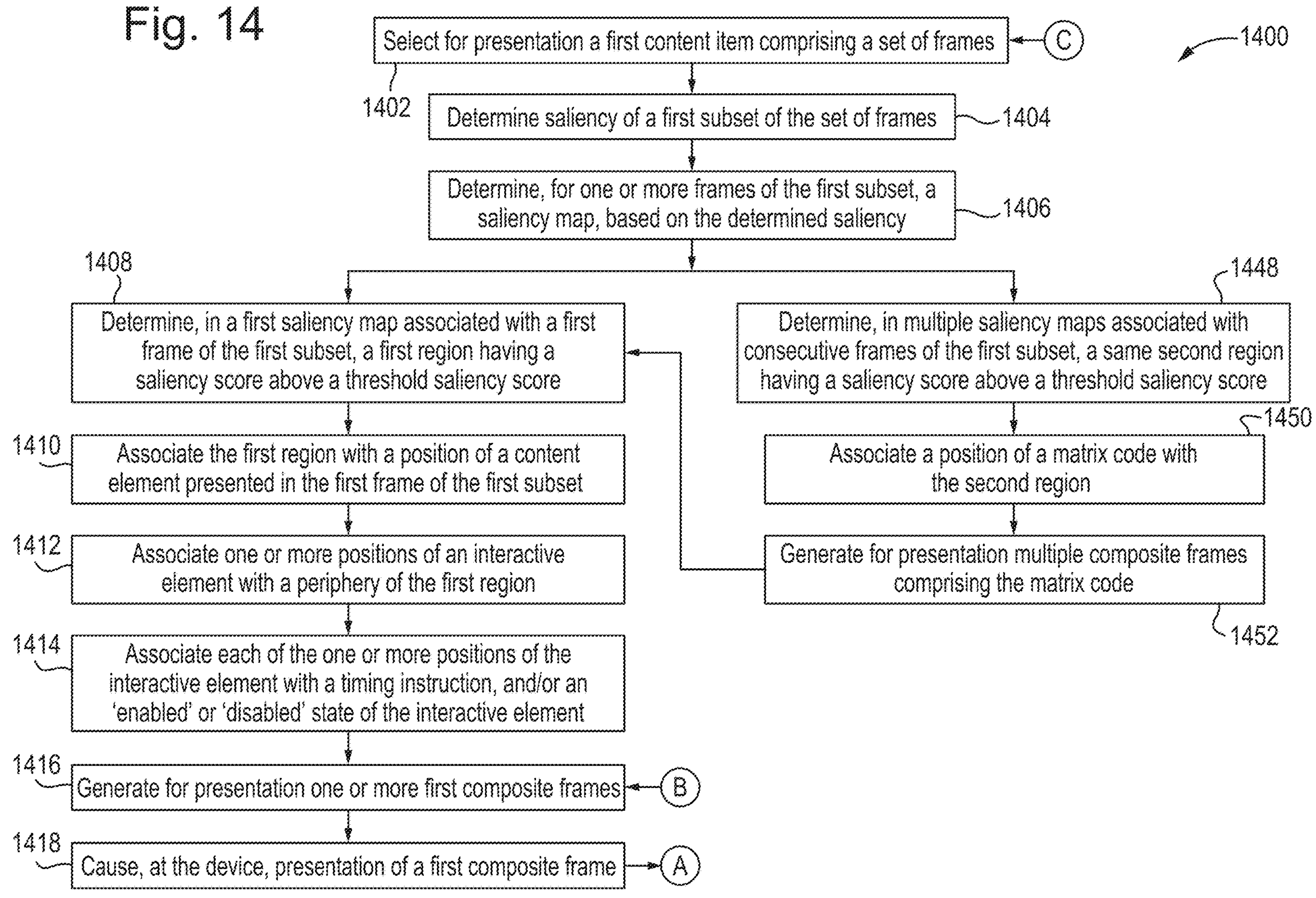
Fig. 14
1400
C
Select for presentation a first content item comprising a set of frames
1402
Determine saliency of a first subset of the set of frames
1404
Determine, for one or more frames of the first subset, a saliency map, based on the determined saliency
1406
1408
Determine, in a first saliency map associated with a first frame of the first subset, a first region having a saliency score above a threshold saliency score
1410
Associate the first region with a position of a content element presented in the first frame of the first subset
1412
Associate one or more positions of an interactive element with a periphery of the first region
1414
Associate each of the one or more positions of the interactive element with a timing instruction, and/or an 'enabled' or 'disabled' state of the interactive element
1416
Generate for presentation one or more first composite frames
B
1418
Cause, at the device, presentation of a first composite frame
A
1448
Determine, in multiple saliency maps associated with consecutive frames of the first subset, a same second region having a saliency score above a threshold saliency score
1450
Associate a position of a matrix code with the second region
Generate for presentation multiple composite frames comprising the matrix code
1452

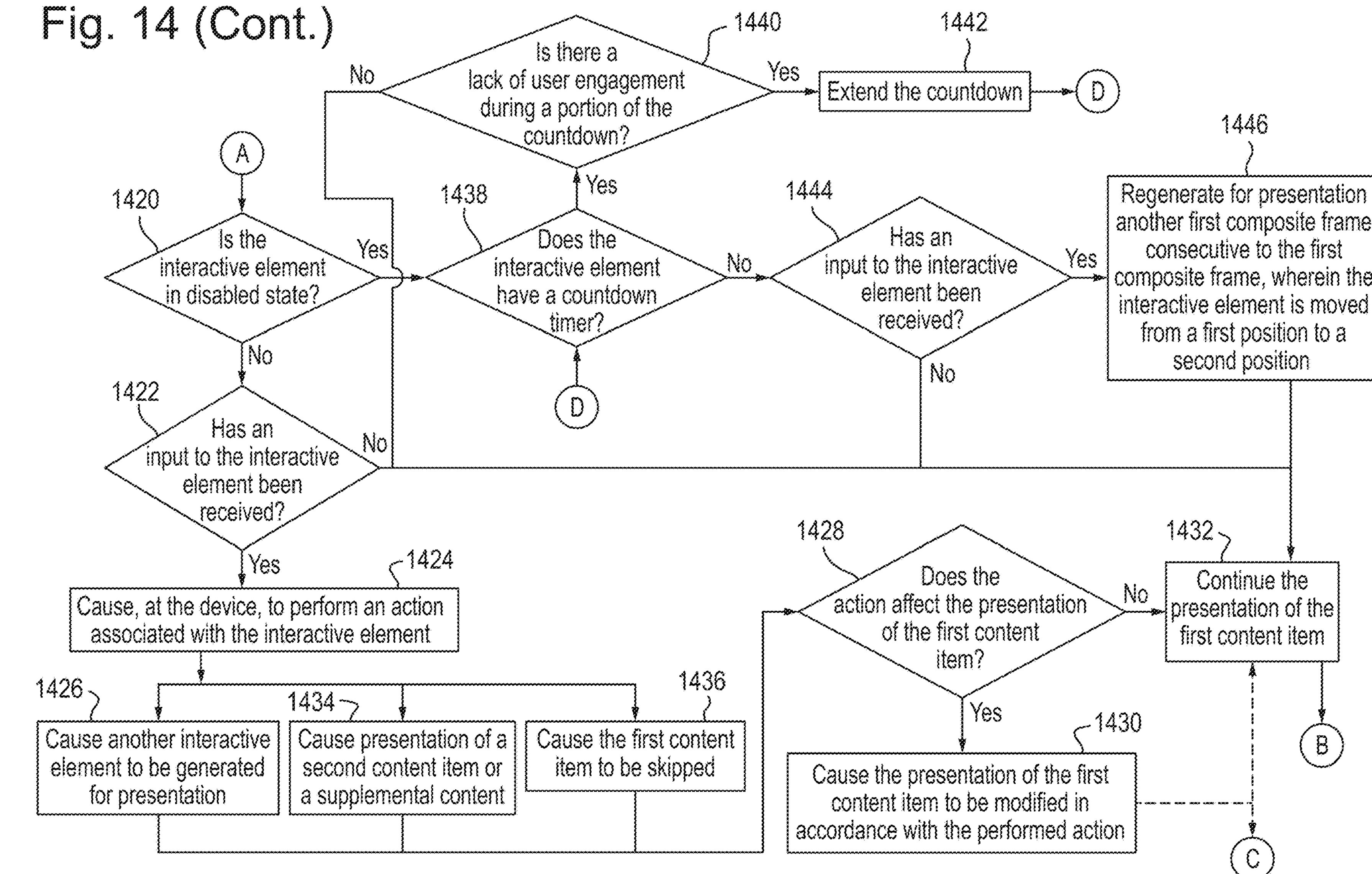
Fig. 14 (Cont.)
A
1420
Is the interactive element in disabled state?
Yes
No
1422
Has an input to the interactive element been received?
No
Yes
1424
Cause, at the device, to perform an action associated with the interactive element
1426
Cause another interactive element to be generated for presentation
1434
Cause presentation of a second content item or a supplemental content
1436
Cause the first content item to be skipped
1438
Does the interactive element have a countdown timer?
D
Yes
No
1440
Is there a lack of user engagement during a portion of the countdown?
No
Yes
1442
Extend the countdown
D
1444
Has an input to the interactive element been received?
Yes
No
1446
Regenerate for presentation another first composite frame consecutive to the first composite frame, wherein the interactive element is moved from a first position to a second position
1428
Does the action affect the presentation of the first content item?
No
Yes
1430
Cause the presentation of the first content item to be modified in accordance with the performed action
1432
Continue the presentation of the first content item
B
C

METHODS AND SYSTEMS FOR IMPROVING USER ENGAGEMENT WITH CONTENT VIA AN ADAPTABLE INTERACTIVE ELEMENT

BACKGROUND

The present disclosure relates to methods and systems for improving user engagement with content, through an adaptable or dynamic element or display icon that is provided to control interactions with the content.

SUMMARY

When playing a content item on a device, the presentation of the content item on the device may be, for example, stopped, paused, or moved on to another content item. A user may skip to a next content item before a current content item has been fully presented on the device. This may occur when the content item has failed to spark the user's interest or the user is simply impatient, such as when viewing a low user-engagement and skippable portion of a content item (e.g., recaps, opening credits, closing credits), or a would-be high user engagement and skippable portion of a content item, such as advertisements. In some cases, the skippable portion of the content item may comprise a 'skip' button at a default position (e.g., lower right corner) on a screen (e.g., a display or a display screen), which the user may expect. The user may then click on a remote control to perform the skip operation when they identify the 'skip' button at the default place. Alternatively, the user may have, in anticipation, a cursor hovering above the default place and click on the 'skip' button when the 'skip' button appears on screen, irrespective of its state (e.g., 'enabled' or 'disabled' state).

Accordingly, the skipping of a skippable portion of a content item is facilitated for the user's benefit, leaving in the device buffer, at an operational expenditure, requested segments associated with a currently presented content item. In effect, should the device receive an instruction to skip the remaining portion of the currently presented content item, those segments in the buffer will not be displayed on the device and may become overwritten by segments of another content item requested for presentation, e.g., after stopping, pausing, or skipping the presentation of the content item. Typically, those unpresented segments have been delivered from a server to the device, consuming processing resource, bandwidth resource, and energy, then stored in the device buffer, using up memory space, and finally overwritten.

There is thus a need for providing methods and systems to decrease wastage of buffered segments, e.g., that will not be displayed on the device as a result of a skip operation. For example, by causing an extension of the user's consumption of an at least partially skippable content item, resource used in generating buffered segments of content need not be wasted. In conventional approaches, a user may be encouraged to increase engagement with content by having an interactive icon (e.g., a 'skip' button) placed outside an expected location. The user must thus focus their attention and scan the screen to identify the unexpected location of the interactive icon on the screen. However, these approaches fail to take into account the content currently displayed to determine an optimal location of the interactive icon in said content. For example, these approaches may inadvertently position the icon on an important element in the content so as to at least partially obfuscate the important element.

Methods and systems implemented by a device (e.g., a server, a user device or a combination server/device thereof), are disclosed herein for enabling an improved management of a buffer resource of the device during a presentation of a content item (e.g., recommended or user-selected content item). Such methods and systems may provide, in one or more frames of the content item, an interactive element, and associate a position of the interactive element with a position of an element in the one or more frames of the content item, e.g., a content element. In some instances, the content element may be a salient or important content element (or content element of interest) for the user (e.g., based on one or more preferences/settings of the user), a plurality of users (e.g., corresponding to a population segment, comprising or not the user, and/or based on one or more preferences/settings of the plurality of users), and/or the content owner/provider/publisher (e.g., based on one or more preferences/settings of the content owner/provider/publisher). In some examples, the content element may be a content element other than a salient or important content element (or content element of interest) for the user (e.g., based on one or more preferences/settings of the user), a plurality of users (e.g., corresponding to a population segment, comprising or not the user, and/or based on one or more preferences/settings of the plurality of users), and/or the content owner/provider/publisher (e.g., based on one or more preferences/settings of the content owner/provider/publisher). The interactive element may be presented in one or more frames of the content item to improve user engagement with the content item, e.g., by rendering the interactive element (crucial to interact in a given manner with the content item) less accessible to the user, by controlling a user's attention and positioning the user's attention from a first content element to the interactive element, from the first content element through the interactive element to a second content element, or from the interactive element to the first content element or second content element. From a technical standpoint, this may result in decreasing the wastage of already-buffered segments, e.g., segments that may not be displayed as a result of a skip operation, or switching to a presentation of another content item. In effect, such methods and systems may compel the user to watch, further or entirely, a content item (that may be or not an at least partially skippable content item), which increases the probability to present all requested segments. In some cases, an improved impression of the content may be received by the user. For example, overall comprehension of a content item may be improved, e.g., as a result of causing an extension to the user's consumption of the content item. In some cases, recall of a product/service associated with the content item may be improved, e.g., by placing the interactive element at a position associated with a desired element for the user (e.g., based on one or more preferences/settings of the user, a plurality of users (e.g., corresponding to a population segment, comprising or not the user, and/or based on one or more preferences/settings of the plurality of users), and/or the content owner/provider/publisher (e.g., based on one or more preferences/settings of the content owner/provider/publisher), e.g., an object, a brand logo, brand motto, product/service, or another piece of information. Additionally, the improved overall comprehension, by the user, of a content item may render useless an additional presentation of the content item to the user. Cancelling the additional presentation of the content item would cancel the related content delivery from the server to the device and the processing, by the device, of the content to be presented, which would save processing resource, bandwidth resource and energy.

In some examples, a first content item is caused, at a device, to be generated for presentation. Positional data defining a position of an interactive element when presented on the device is determined, wherein the positional data associates the position of the interactive element with a position of a content element presented in the first content item. The interactive element is caused to be generated for presentation at a first position based on the positional data.

In some instances, the device (e.g., a user device, client device) may be in communication, via a communication network (e.g., LAN or WAN), with a server. In some instances, the device may stream, from the server, the first content item using a player (e.g., a video player). Alternatively, the device may download from the server, and present using the player, the first content item. In some instances, the first content item may comprise at least one of a movie, a video clip or an ad. In some instances, the first content item may comprise, e.g., a supplemental content (such as derived from the first content item), an advert, titles, and/or credits.

In some instances, the interactive element may be a 'skip' button, a 'call to action' button (e.g., 'send to phone' button, 'press OK' button, 'shop now' or 'buy now' button, etc.), an 'OK' button, a 'x % off' button with 'x' a real number belonging to an open interval between zero and 100, etc. In some instances, the interactive element may be overlaid on and positioned in one or more frames of the first content item. In some instances, the interactive element may be positioned within (when the interactive element does not obfuscate the region in which the interactive element is positioned), outside, at the periphery of or in proximity to a region of the one or more frames. In some instances, an outline of the region of the one or more frames may change or not across the one or more frames. In some instances, the one or more frames are a set of frames and the interactive element may be positioned within (when the interactive element does not obfuscate the region in which the interactive element is positioned), outside, at the periphery of or in proximity to a first region of the set of frames in a first subset of the set of frames and to a second region of the set of frames in a second subset of the set of frames, wherein the first region is different from the second region. In some instances, the region may be designated, set, important, salient, or of interest, based on whether a saliency score associated with the region is above a threshold saliency score. Alternatively, the region may not be designated, set, important, salient, or of interest, based on whether the saliency score associated with the region is below the threshold saliency score.

In some instances, the interactive element may be positioned within (when the interactive element does not obfuscate a content element), outside, at the periphery of, or in proximity to the content element of the one or more frames, the content element changing or not across the one or more frames. In some instances, the content element may be designated, set, important, salient, or of interest, based on whether a saliency score associated with the content element is above a threshold saliency score. In some instances, the threshold saliency score may be based on one or more user preferences/settings of a user (or a plurality of users), and/or one or more preferences/settings of a content owner/provider/publisher. For example, the designated, set, important or salient content element, or content element of interest may be a logo, a brand, a product or service of a brand. Alternatively, the content element may not be designated, set, important, salient, or of interest, based on whether the saliency score associated with the region is below the threshold saliency score. In some instances, the content element may comprise an object, a logo, a text, a graphic, an image, and/or a character. In some instances, the content element is comprised in a region of the one or more frames. In some instances, the interactive element may be positioned within (when the interactive element does not obfuscate the one or more content elements in which the interactive element is positioned), outside, at the periphery of, or in proximity to one or more content elements in the one or more frames of the first content item. In some instances, a center of the interactive element is a barycenter of the one or more content elements in a frame of the one or more frames. In some instances, a center of the interactive element may be positioned relative to a region or content element of a frame of the one or more frames of the first content item, wherein the region or content element has a saliency score above a threshold saliency score. In some instances, a center of the interactive element may be positioned, relative to a region or content element, on a frame of a content item, based on a saliency score of a pixel (of the frame) that is to accommodate the center of the interactive element, or on whether the saliency score of the pixel is within a saliency score range or above a threshold saliency score. In some instances, the interactive element may be positioned, relative to a region or content element, on a frame of a content item, based on an average saliency score associated with pixels to accommodate the interactive element, or on whether the average saliency score of the pixels is within a saliency score range or above a threshold saliency score.

In some instances, the position (e.g., a determined optimal position) of the interactive element may change across the one or more frames. If the interactive element were to have a trajectory or follow a trajectory from a user's perspective, the position of the interactive element would change gradually across the one or more frames such that two consecutive positions of the interactive element would, for example, partially overlap, or be apart at a distance sufficiently moderate, e.g., for the user to assimilate the two consecutive positions as points of a same trajectory. If the interactive element were not to have a trajectory or follow a trajectory from the user's perspective, the position of the interactive element would change drastically across the one or more frames such that two consecutive positions of the interactive element would, for example, be apart at a distance sufficiently large, e.g., for the user to not assimilate the two consecutive positions as points of a same trajectory. For instance, the interactive element would appear in the upper left corner in a first frame and then in the lower right corner of a second frame as if the interactive element were teleported from the upper left corner in the first frame to the lower right corner of the second frame. The server and/or device may change the position of the interactive element upon identifying a position for the interactive element, but such changes may be jarring to a user. The server or device may generate, for the interactive element, a smooth path between a current position of the interactive element and a future position of the interactive element. In some instances, the server or device may limit maximum movement and acceleration speed to ensure visibility and interactivity of the interactive element. In some instances, the server or device may modify a generated path to avoid occluding one or more designated, set, important or salient regions, or regions of interest. In some instances, the server or device may modify a generated path to avoid occluding one or more designated, set, important or salient content elements, or content elements of interest. In some instances, the server or device may use a visual tracking model (e.g., an object tracking model) to track a trajectory of one or more content elements and use information associated with the trajectory of the one or more content elements to create a trajectory of the interactive element associated with the one or more content elements, e.g., that does not obfuscate and/or overshadow the one or more content elements. For example, the server or device may use a brand saliency model to track, for each brand asset of a set of brand assets, a trajectory of the brand asset and use information associated with trajectories of the set of brand assets to create a trajectory for the interactive element associated with at least a subset of the set of brand assets. For example, the first content item may feature a car emblazoned with a company logo driving past a camera, in which case the interactive element may follow the company logo as the company logo moves across a display screen without obfuscating and/or overshadowing the company logo.

In some instances, the position of the interactive element may change across the one or more frames of the first content item, hence the above-mentioned 'first position'. In some instances, the positional data may comprise, for each frame of the one or more frames, a respective position of the interactive element. In some instances, a first position of the interactive element in a first frame of the one or more frames of the first content item may be identical to or different from a second position of the interactive element in a second frame of the one or more frames of the first content item. In some instances, the positional data may be determined, by the server or device, e.g., by retrieving content signalling (e.g., data structure, metadata) generated by a content provider, owner or publisher. The positional data may be determined, based on image analysis (e.g., using an image analysis module comprising one or more algorithms), by the server or device. The image analysis module may run either at the server or device. If run at the server, then data instructions (e.g., metadata or data structure) associated with the image analysis are generated to specify proposed positions of the interactive element on a frame-by-frame basis and sent to the player of the device to be implemented. If run at the device, data instructions are generated at the device and implemented by the player of the device. In some instances, the image analysis module may comprise semantic segmentation for at least a frame of the one or more frames of the first content item, and ascribe, to each pixel of the at least a frame, a respective class label corresponding to a respective saliency score (e.g., visual saliency score), e.g., retrieved from a list of saliency scores established from a content provider, owner, publisher, a user and/or a plurality of users. This allows for establishing a saliency map for each of the at least a frame of the one or more frames of the first content item. In some instances, an algorithm of the image analysis module may identify text and determine a saliency score (e.g., semantic saliency score) based on the identified text. In some instances, an algorithm of the image analysis module may favour a semantic saliency score over a visual saliency score. In some instances, an algorithm of the image analysis module may aggregate all types of saliency scores to determine a saliency score of a content element or a region of the at least a frame of the one or more frames of the first content item. In some instances, the data structure or metadata may be determined, by the content provider, owner or publisher, using the aforementioned image analysis module based method implemented by the server or device.

In some instances, the server may overlay, based on data structure or metadata from the content provider, owner or publisher, or image analysis implemented by the server, the interactive element on the one or more frames of the first content item to generate one or more composite frames associated with the first content item. The device may receive in a buffer and decode encoded segments comprising the one or more composite frames associated with the first content item (e.g., as encoded frames) and generate for presentation the one or more composite frames.

In some instances, the device may receive in a buffer and decode segments comprising the one or more encoded frames of the first content item. The device may overlay, based on data structure or metadata from the content provider, owner or publisher, or image analysis implemented by the server or device, the interactive element on the one or more frames of the first content item to generate for presentation one or more composite frames associated with the first content item.

In some examples, the positional data may define multiple positions of the interactive element when presented on the device. Timing instructions associated with each of the multiple positions may be received at the device. The presented position of the interactive element may be caused to be updated based on the positional data and the timing instructions.

This may define a path or trajectory of the interactive element. In some instances, metadata or data structure may comprise, e.g., for each frame of the one or more frames of the first content item, a format tuple associated with the interactive element. The format tuple associated the interactive element may comprise data, e.g., a timestamp (or progression point) associated with a frame of the one or more frames of the first content item and a set of characteristics associated with the interactive element in the frame. The set of characteristics of the interactive element may comprise, e.g., location, size, shape, transparency level, color range, content, function (or behavior), and state (e.g., 'disabled' state, 'enabled' state). In some instances, the set of characteristics of the interactive element may be in part determined based on one or more user preferences/settings of a user or a plurality of users so as to more easily capture a user's attention and to re-distribute it to a content element of a frame of the one or more frames of the first content item. In some instances, the set of characteristics of the interactive element may not be in part determined based on one or more user preferences/settings of a user or plurality of users so as to not overshadow a content element of a frame of the one or more frames of the first content item.

For each frame of the one or more frames of the first content item, each characteristic of the set of characteristics of the interactive element has a respective value (e.g., number with/without a unit, coordinates, or option) among available values. For example, a size of the interactive element may be determined based on a size of one or more content elements in a frame of the first content item such that the interactive element does not overshadow or obfuscate the one or more content elements. For example, a size of the interactive element may be determined based on a size of a display that is to present the first content item. For example, a transparency level of the interactive element may be expressed as a number in percentage and may depend on a state of the interactive element. The higher the percentage of the transparency level, the more transparent or faded the interactive element appears, the more likely the interactive element is in a 'disabled' state. The lower the percentage of the transparency level, the more opaque the interactive element appears, the more likely the interactive element is in an 'enabled' state. For example, a location of the interactive element may be expressed as coordinates in a frame. For example, a shape of the interactive element may be expressed as a square, a disc, rectangle, rounded rectangle, etc. For example, each pixel of the interactive element may have a respective color. The interactive element may have a range of colors that comprises one or more colors, each color being associated with coordinates in a color-related referential (e.g., as in RGB color model). For example, the content of the interactive element (e.g., presented to a user) may comprise an outline, a background, and one or more objects, that are enclosed in the outline and overlaid on the background. In some instances, a pixel of the outline may have a color different from a pixel of the background and/or the one or more objects. In some instances, a pixel of the outline may have a same color as a pixel of the background and/or the one or more objects. The one or more objects may comprise, e.g., a text associated with the function of the interactive element, a brand logo, a trade mark, a brand motto, a product and/or service, related to a company. Therefore, the adaptable or dynamic aspect of the interactive element results from the possibility to impart, across frames of the one or more frames of the first content item, a change in value for one or more characteristics of the set of characteristics of the interactive element.

In some instances, a first format tuple associated with a first frame and a second format tuple associated with a second frame cannot be distinguished based on orders of data in the first format tuple and the second format tuple. In some instances, at least a characteristic of a set of characteristics of the interactive element associated with a first frame of the one or more frames of the first content item may be different in value from a corresponding at least a characteristic of a set of characteristics of the interactive element associated with a second frame of the one or more frames of the first content item, the first frame being different from the second frame. In some instances, a characteristic of a set of characteristics of the interactive element associated with a first frame of the one or more frames of the first content item may be identical in value from a corresponding characteristic of a set of characteristics of the interactive element associated with a second frame of the one or more frames of the first content item, the first frame being different from the second frame. In some instances, there may be no format tuple associated with a frame of the first content item when no interactive element is to be overlaid on the frame to form a composite frame, the frame being different from the one or more frames of the first content item. In some instances, a format tuple associated with a frame of the first content item may be empty when no interactive element is to be overlaid on the frame to form a composite frame, the frame being different from the one or more frames of the first content item. In some instances, the content item comprises the one or more composite frames associated with the first content item, and may comprise original frames of the first content item, for which the metadata did not instruct the device to generate for presentation a corresponding composite frame. In some instances, a value of a characteristic of the set of characteristics may be selected, for a plurality of frames, among available values, e.g., arranged in wheel of fortune, wherein the values may be fixed or alternated in a round robin fashion.

In some examples, the positional data may be determined by determining a saliency map of the first content item. Additionally or alternatively, the positional data may be determined by associating a first region of the saliency map with the position of the content element presented in the first content item. Additionally or alternatively, the positional data may be determined at least by associating the position of the interactive element with, e.g., an outside, a periphery, an outline, an inside of the first region of the saliency map.

In some instances, the saliency map may be determined, e.g., using an algorithm of the image analysis module, by the content provider, owner, publisher, server, and/or device.

In some instances, the transparency level of the interactive element may be determined based on, e.g., a state of the interactive element (e.g., 'enabled' or 'disabled' state), a distance between the interactive element and the content element associated with the interactive element, a possibility for the server or device to hide the interactive element on a display. In some instances, the larger the distance between the interactive element and the content element associated with the interactive element, the lower the transparency level (e.g., the less faded the interactive element appears), and reciprocally, so as to prevent the interactive element from obfuscating and/or overshadowing the content element. In some instances, the server or device may hide the interactive element on a display by increasing the transparency level of the interactive element, while changing or not the position of the interactive element, to elude a user that keeps interacting with the interactive element via a user interface input, e.g., when the interactive element is in a 'disabled' state (e.g., with or without a countdown timer). This may improve user engagement with the first content item. In some instances, the server or device may hide the interactive element on a display by increasing the transparency level of the interactive element, while changing or not the position of the interactive element, to compel a user to look for the interactive element on the display and thus improve user engagement with the first content item.

In some examples, the saliency map may be determined by determining a visual saliency (e.g., a visual saliency score) of the first content item. Alternatively or additionally, the saliency map may be determined at least by determining a semantic saliency (e.g., a semantic saliency score) of the first content item. Alternatively or additionally, the saliency map may be determined by determining a brand saliency (e.g., a brand saliency score) by training the image analysis model on assets associated with a brand, for example, registered or unregistered industrial designs, registered or unregistered trade marks, logos, mottos, ads, etc. In some instances, the saliency map may be determined based on at least one of visual saliency, semantic saliency or brand saliency.

In some examples, a second region of the saliency map may be determined, the second region having a saliency score above a threshold saliency score over a duration of the presentation of the first content item. A matrix code (e.g., a quick response (QR) code) may be caused for presentation at a position associated with the second region.

In some instances, the server or device may overlay, in one or more frames of the first content item, the matrix code when the interactive element has been interacted with via a user interface input, that may comprise, for example, clicking (e.g., using a remote control, mouse, or joystick), emitting a voice command (captured by a microphone), or gazing for a duration at a location in a display (wherein a sensor tracks a user gaze). In some instances, the server or device may overlay, in one or more frames of the first content item, the matrix code within (when the matrix code does not obfuscate the second region), at a periphery of, in proximity to, or outside of the second region. The matrix code needs to be static across multiple consecutive frames in order to be properly read by a portable device (e.g., mobile phone, tablet).

In some examples, an input (e.g., a user interface input) to the interactive element may be received. Supplemental content may be caused for presentation on the device, in response to receiving the input, wherein the supplemental content may be derived from the first content item displayed on the device.

In some instances, based on a combination of factors such as visual complexity, emotional intensity, and a presence of distinct or repeated content elements, the server or device may identify, using the image analysis module, one or more most memorable frames of at least a portion (e.g., a scene) of the first content item based on determining one or more most memorable or impactful content elements. Instead of presenting the one or more most memorable frames of the at least portion of the first content item as such, the server or device may employ deep learning techniques, such as Generative Adversarial Networks (GANs), to generate one or more new composite frames associated with the at least a portion of the first content item. The one or more new composite frame may combine the one or more (e.g., most) memorable or impactful content elements from the one or more (e.g., most) memorable frames of the first content item. For example, the server or device may identify, using Convolutional Neural Networks (CNNs) trained on memorability datasets, one or more regions of the one or more memorable frames of the at least portion of the first content item having each a memorability score above a threshold memorability score. Once the one or more memorable content elements of the one or more memorable frames of the at least a portion of the first content item are identified—such as a distinctive facial expression, a notable background, or a striking object—GANs may generate the one or more new composite frames associated with the at least a portion of the first content item by combining/blending the one or more memorable content elements into a cohesive and optimal visual. For instance, a highly memorable expression from a scene may be merged with an iconic background from another scene, creating a new composite frame associated with the at least a portion of the first content item that is more effective in triggering a user's memory than any of the one or more memorable frames of the at least portion of the first content item. In some instances, the supplemental content may comprise the one or more new composite frames associated with the at least a portion of the first content item, and generated by GANs.

In some instances, the supplemental content derived from the first content item may comprise, e.g., at least one of a matrix code (e.g., QR code), a webpage (e.g., comprising or not a link such as a hyperlink), or at least a portion of a content item different from the first content item. In some instances, interacting with the interactive element via a user interface input causes a matrix code to be presented by scaling down the first content item to provide enough room, on a screen, to accommodate the matrix code.

In some instances, upon activation of the interactive element, the server or device may present, to a user, the one or more new composite frames for a short duration as a "last gasp" message before a second content item (e.g., a next ad, a video program) starts being presented. In some instances, the server or device may generate the one or more new composite frames by having the one or more (e.g., most) memorable or impactful content elements at the periphery of or in proximity to the position of the interactive element in a first frame presented prior to (e.g., right before) the one or more new composite frames. This takes advantage of the fact that the user's focus is localized at the position of the interactive element in the first frame, and may easily "spread" to the one or more memorable or impactful content elements when the one or more new composite frames are presented after the first frame.

In some examples, the interactive element may be caused to be inactive for a period. An input (e.g., a user interface input) to the interactive element may be received during the period. The interactive element may be caused to be generated for presentation at a second position based on the positional data, in response to receiving the input to the interactive element during the period.

In some instances, the interactive element may be in a 'disabled' state such that interacting with the interactive element via a user interface input does not result in performing an action, the action being supposedly performed when interacted with the interactive element in an 'enabled' state. In some instances, interacting with the interactive element in the 'disabled' state before switching to the 'enabled' state may change the position of the interactive element from the first position to a second position different from the first position. This may allow for avoiding "double clicking" and compel the user to maintain, in a frame of the first content item, their focus on important or salient content element, or content element of interest.

In some instances, the server or device may detect that a user interacts with the interactive element via a user interface input, even though the interactive element is in a 'disabled' state. This may happen when the interactive element is to switch from the 'disabled' state to an 'enabled' state after a set time (e.g., 5 seconds, 30 seconds, etc.). Upon detecting that the user interacts with the interactive element via the user interface input before the set time expires, the server or device may move the interactive element, from an initial position to a future position, onto an important or salient region of a frame once the interactive element is to switch to the 'enabled' state, the future position being different from the initial position. In some instances, the server or device may identify one or more important or salient regions of the first content item and select an important or salient regions from the one or more important or salient regions to position the interactive element based on the time remaining from the set time.

In some examples, an input (e.g., a user interface input) to the interactive element may be received. A second content item may be caused for presentation on the device, in response to receiving the input to the interactive element, wherein the second content item is presented in a modified format (e.g., scaled up, scaled down, at least partially obfuscated as an 'L'-shaped banner or ribbon) and concurrently with at least a portion of the first content item.

In some instances, the second content item may comprise at least one of a movie, a video clip, an ad, or a webpage. In some instances, the second content item may comprise additional information about a product or service advertised in the first content item, or a brand of the product or service advertised in the first content item.

In some instances, the receipt of the input to the interactive element may modify a format of the first content item, e.g., from a first frame format to an 'L'-shaped banner or ribbon format while the second content item may be caused for presentation as a second frame format, wherein the second frame format is smaller than the first frame format. This arrangement may allow for presenting concomitantly the first content item and second content item while favoring the second content item. In some instances, the 'L'-shaped banner or ribbon may comprise, e.g., at least one of a matrix code and one or more brand assets. In some instances, an input (e.g., a user interface input) to the 'L'-shaped banner or ribbon may cause another presentation of the first content item in a third frame whose format corresponds to the first frame format. The presentation of the second content item may be stopped and the second frame may be hidden during the presentation of the first content item.

In some examples, the interactive element may be caused to be inactive for a period (e.g., determined by a countdown timer). A lack of user engagement with the presentation of the first content item is determined during the period. The period is extended based on the lack of user engagement.

In some instances, the period may be determined by a countdown timer. In some instances, the period may be extended based on the lack of user engagement, e.g., by pausing the countdown timer. The lack of user engagement may be based on the user gaze, position, pose, and/or interaction with the first content item. In some instances, the lack of user engagement with the presentation of the first content item may comprise the fact that the presentation of the first content item may occur, at the device, as a background process or the user is not consuming the first content item. In some instances, the device may determine that the user is not consuming the first content item using a sensor (e.g., camera, LIDAR, eye-tracking sensor) or by determining whether Wi-Fi signals are modified due to the presence of a user, their position and pose.

In some instances, the device may continue presenting audio of the first content item while pausing the countdown timer of the interactive element, when a user has "tabbed away" from a browser window or application presenting the first content item to another browser window or application presenting a third content item. In some instances, the device may pause the first content item upon detecting a user's browser window is no longer focused on the first content item.

In some examples, another interactive element (e.g., a 'call to action' button) may be generated for presentation, at the device, during the presentation of the first content item.

An input (e.g., a user interface input) to the other interactive element may be received. The interactive element (e.g., a 'skip' button) may be caused to be generated for presentation in response to receiving the input to the other interactive element.

In some instances, a 'call to action' button may comprise a 'send to phone' button, 'press OK' button (or 'OK' button), 'shop now' or 'buy now' button, 'first response' button (e.g., 'yes' button, a button exhibiting a text responding to a question asked), 'second response' button (e.g., 'no' button, a button exhibiting a text responding to a question asked), for example. Compelling the user to interact with a 'call to action' button via a user interface input may result in presentation of a 'skip' button and implementation of an action associated with a type of 'call to action' button. For instance, interacting with a 'shop now' or 'buy now' button via a user interface input may generate for presentation a webpage to access information about a product or service advertised in the first content item or place an order for the product or service. For example, interacting with a 'send to phone' button via a user interface input may generate for presentation the first content item at a later time point on a portable device (e.g., a laptop, tablet, or mobile phone). For instance, interacting with an 'OK' button (or 'press OK' button) via a user interface input may generate for presentation a webpage to access information about a product or service advertised in the first content item or place an order for the product or service. For instance, interacting with a 'first response' button or a 'second response' button via a user interface input may generate for presentation a reward (e.g., a gift, a price discount, voucher, etc.).

In some instances, the interactive element (e.g., 'skip' button) and the other interactive element (e.g., the 'call to action' button) may be presented simultaneously when the other interactive element has been interacted with, via an input (e.g., user interface input), to cause the presentation of the interactive element. The interactive element and the other interactive element may be overlaid on different positions in a frame of the first content item in order for the user to comprehend respective functions of the interactive element and the other interactive element. The interactive element may swap position with the other interactive element at a second time point occurring after a first time point associated with the input, the first time point and second time point being spaced apart by a period of time varying between, e.g., 0 and 10 seconds. This may allow for at least one of the interactive element and the other interactive element to be more exposed to a user's scrutiny and extend the presentation of the first content item such that more buffered segments associated with the first content item get presented to the user. For instance, a 'skip' button may be overlaid on a frame of the first content item when a 'send to phone' button overlaid at a default position (e.g., bottom right corner) in the frame is interacted with via an input (e.g., a user interface input). The 'skip' button may be initially overlaid, next to (e.g., on the left of) the 'send to phone' button, at a position that does not accommodate at least a portion of the 'send to phone' button. Three seconds after the occurrence of the input, the 'skip' button swaps position with the 'send to phone' button so as to be positioned on the default position.

BRIEF DESCRIPTION OF DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which:

FIG. 1C depicts a set of example interactive elements for enabling an improved management of a buffer resource of a device during a presentation of a content item, in accordance with some implementations of the disclosure;

FIG. 3 shows an example flow diagram of illustrative steps involved in enabling an improved management of a buffer resource of a device during a presentation of a content item, in accordance with some implementations of the disclosure;

FIG. 5 depicts a set of multiple example frames of a content item for enabling an improved management of a buffer resource of a device during a presentation of the content item, in accordance with some implementations of the disclosure;

FIG. 11 shows a set of example screens for enabling an improved management of a buffer resource of a device during a presentation of a content item, in accordance with some implementations of the disclosure;

FIG. 14 illustrates an example flow diagram of illustrative steps involved in enabling an improved management of a buffer resource during a presentation of a content item, in accordance with some implementations of the disclosure.

DETAILED DESCRIPTION

Figure 1A:
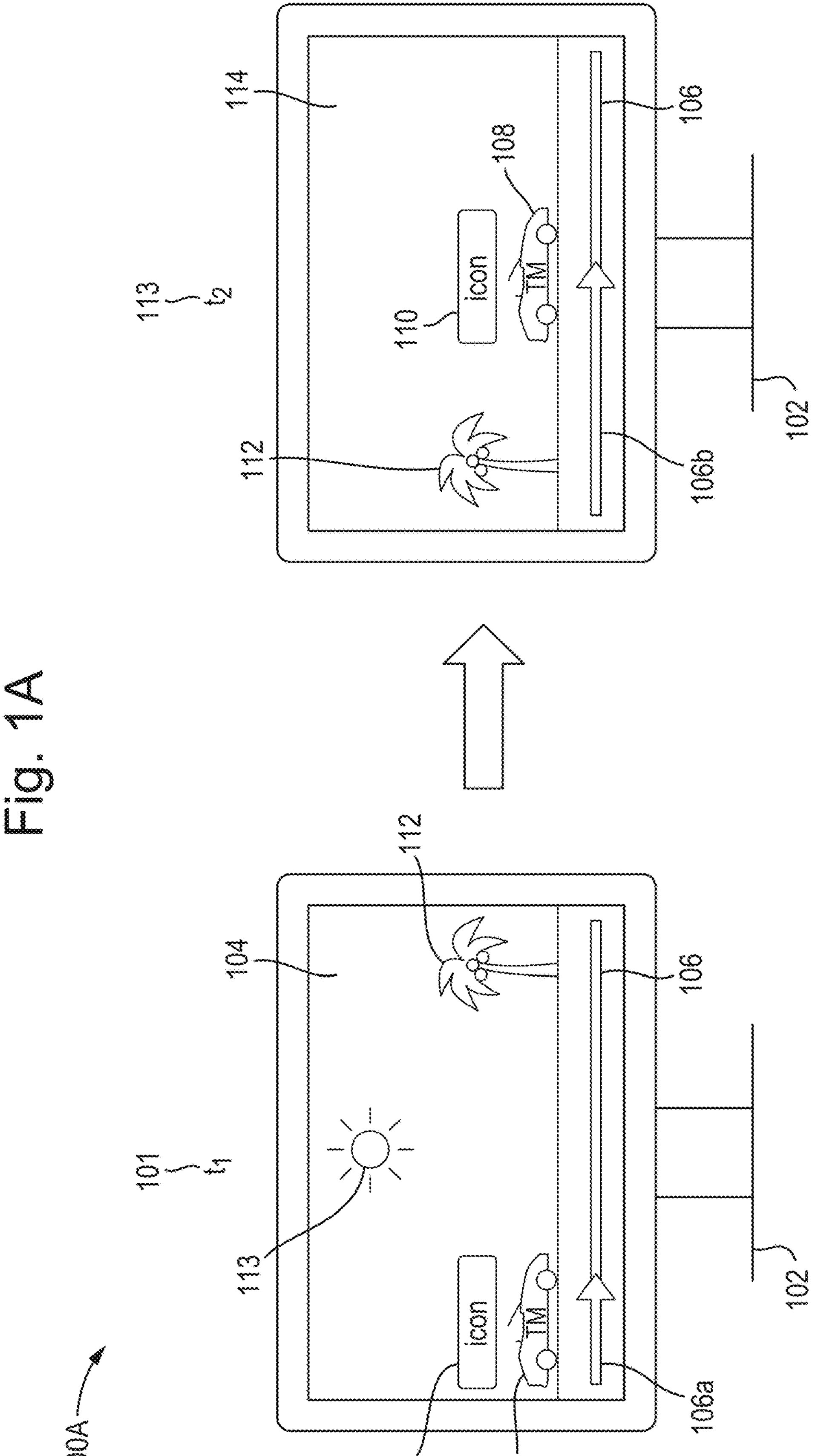
FIG. 1A shows an example for enabling an improved management of a buffer resource of a device during a presentation of a content item, in accordance with some implementations of the disclosure.

As referred to herein, the term 'content item' comprises an electronically consumable user asset, such as an electronic version of a printed book, electronic television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, blogs, advertisements, chat sessions, social media, applications, games, and/or any other media or multimedia and/or combination of the same. The examples described herein may refer to generating for presentation an interactive element associated with a 'content item', e.g., relative to a frame or a display configured for presenting at least a portion of the content item. For the avoidance of doubt, when an example uses the term 'ad', that example is understood to not be limited to an implementation in the context of advertising, and such a term has been used as one of many equally applicable examples of a 'content item'.

As referred to herein, the term 'composite frame' and 'precursor frame' are defined as: a composite frame results from overlaying an interactive element on a frame of a content item, the frame being a precursor frame of the composite frame.

As referred to herein, a user interface input may comprise, for example, clicking, tapping, or otherwise selecting (e.g., using a remote control, mouse, or joystick), providing a voice command (captured by a microphone), or gazing for a duration at a location in a display (wherein a sensor detects a user gaze). In some instances, an additional element overlaid as a geometric shape (e.g., circle, etc.), in the vicinity of a first position, on one or more frames of a content item may represent a minimum duration, for a user gaze at a second position in a display of a device (presenting the content item) mapped to the first position, to become a user interface input received by the device. The geometric shape is filled up as long as a user gazes at the second position (e.g., a position of an interactive element), until being completely filled up, which causes an implementation of a user interface input to the interactive element. In some instances, the implementation of the user interface input to the interactive element may cause or not an action associated with the interactive element based on a state (e.g., 'enabled' or 'disabled' state) of the interactive element. For example, interacting with the interactive element in the 'enabled' state causes the action associated with the interactive element to be caused. For example, interacting with the interactive element in the 'enabled' state causes the action associated with the interactive element to be caused. For example, interacting with the interactive element in the 'disabled' state causes the action associated with the interactive element to not be caused. In some instances, the implementation of the user interface input to the interactive element may cause or not an action that is not associated with the interactive element based on a state of the interactive element (e.g., 'enabled' or 'disabled' state) of the interactive element. For example, the action non associated with the interactive element comprises moving the interactive element from a current position in a frame to a future position in the frame (different from the current position) when a user interacts at least a number 'n' of times with the interactive element that is in a 'disabled' state, the number 'n' being a natural integer above zero.

FIG. 1A shows an example 100A for enabling an improved management of a buffer resource of a device 102 during a presentation of a content item, in accordance with some implementations of the disclosure. Example 100A comprises device 102 configured to present, to a user, a content item, e.g., user-selected or content provider-recommended content item. In some instances, device 102 may be, e.g., a smart TV, a mobile phone, a tablet, a laptop, an extended reality device, a smart watch, a computer, or the like. In some instances, a device (e.g., a user device, client device) may be in communication, via a communication network (e.g., LAN or WAN), with a server. In some instances, the device may stream or play, from the server, the content item using a player (e.g., a video player). In some examples, the device may download from the server, and present using the player, the content item. In some instances, the content item may comprise at least one of a movie, a video clip or an ad. The content item comprises a 'TM' branded car 108. The device presents composite and precursor frames that may comprise or not 'TM' branded car 108.

At a time point '$t_1$' 101, device 102 presents a composite frame 104 associated with a progression point (or timestamp) 106*a*, wherein composite frame 104 comprises a 'TM' branded car 108, an interactive element 110, a palm tree 112 and a sun 113. In composite frame 104, 'TM' branded car 108 is located in a lower left corner of composite frame 104, opposite to palm tree 112 located in a lower right corner of composite frame 104, while sun 113 is located in an upper portion of composite frame 104 in the middle of composite frame 104 width. Interactive element 110 is located above and at the periphery of (or in proximity to) 'TM' branded car 108. A progress bar 106 indicating progression point (or timestamp) 106*a* is reversibly overlaid, upon user interface input, on composite frame 104. In some instances, progress bar 106 indicating progression point (or timestamp) 106*a* may be presented on a ribbon adjacent to (and, e.g., below) composite frame 104.

At a time point '$t_2$' 113 after time point '$t_1$' 101, device 102 presents a frame 114 associated with a progression point (or timestamp) 106*b*, wherein composite frame 114 comprises 'TM' branded car 108, interactive element 110 and palm tree 112. In composite frame 114, 'TM' branded car 108 is positioned in a lower portion of composite frame 114 in a middle of composite frame 114 width, and right from palm tree 112. Interactive element 110 is located above and at the periphery of (or in proximity to) 'TM' branded car 108. A progress bar 106 indicating progression point (or timestamp) 106*b* is reversibly overlaid, upon user interface input, on composite frame 104. In some instances, progress bar 106 indicating progression point (or timestamp) 106*b* may be presented on a ribbon adjacent to (and, e.g., below) composite frame 114.

Accordingly, from time point '$t_1$' 101 to time point '$t_2$' 113, 'TM' branded car 108 appears to move, on the display, from left to right. Similarly, interactive element 110 appears to follow 'TM' branded car 108, as if attached to 'TM' branded car 108. In some instances, 'TM' branded car 108 may be a content element of the content item associated with a saliency score reflecting an importance of the content element for the user (e.g., based on one or more preferences/settings of the user), a plurality of users (e.g., corresponding to a population segment, comprising or not the user, and/or based on one or more preferences/settings of the plurality of users), and/or a content owner/provider/publisher (e.g., based on one or more preferences/settings of the content owner/provider/publisher). In some instances, 'TM' branded car 108 may be a content element of the content item associated with a saliency score above a threshold saliency score. In some instances, the threshold saliency score may be associated with the user (e.g., based on one or more preferences/settings of the user), a plurality of users (e.g., corresponding to a population segment, comprising or not the user, and/or based on one or more preferences/settings of the plurality of users), and/or the content owner/provider/publisher. In some instances, 'TM' branded car 108 may be a more or most important content element of the content item, e.g., based on a saliency score, or a comparison of a saliency score with a threshold saliency score. In some instances, the threshold saliency score may be associated with the user (e.g., based on one or more preferences/settings of the user), a plurality of users (e.g., corresponding to a population segment, comprising or not the user, and/or based on one or more preferences/settings of the plurality of users), and/or the content owner/provider/publisher (e.g., based on one or more preferences/settings of the content owner/provider/publisher). In some instances, interactive element 110 may borrow features of a more or most important content element, e.g., of the content item, for the user (e.g., based on one or more preferences/settings of the user), a plurality of users (e.g., corresponding to a population segment, comprising or not the user, and/or based on one or more preferences/settings of the plurality of users), and/or the content owner/provider/publisher (e.g., based on one or more preferences/settings of the content owner/provider/publisher). All those instances cited in the present paragraph may allow for extending user engagement with the content item currently presented so as to present, to the user, a larger amount of buffered segments associated with the content item, compared to the case where interactive element 110 is fixed at a default position (e.g., lower right corner) in frames 104 and 114. All or some of the instances cited in the present paragraph may also result in controlling the user's gaze on the currently presented content item for a longer duration by pointing to one or more content elements of the content item or by creating an appealing interactive element 110, e.g., based on one or more preferences/settings of a user, a plurality of users (e.g., population segment), and/or a content owner/provider/publisher (e.g., based on one or more preferences/settings of the content owner/provider/publisher).

Figure 1B:
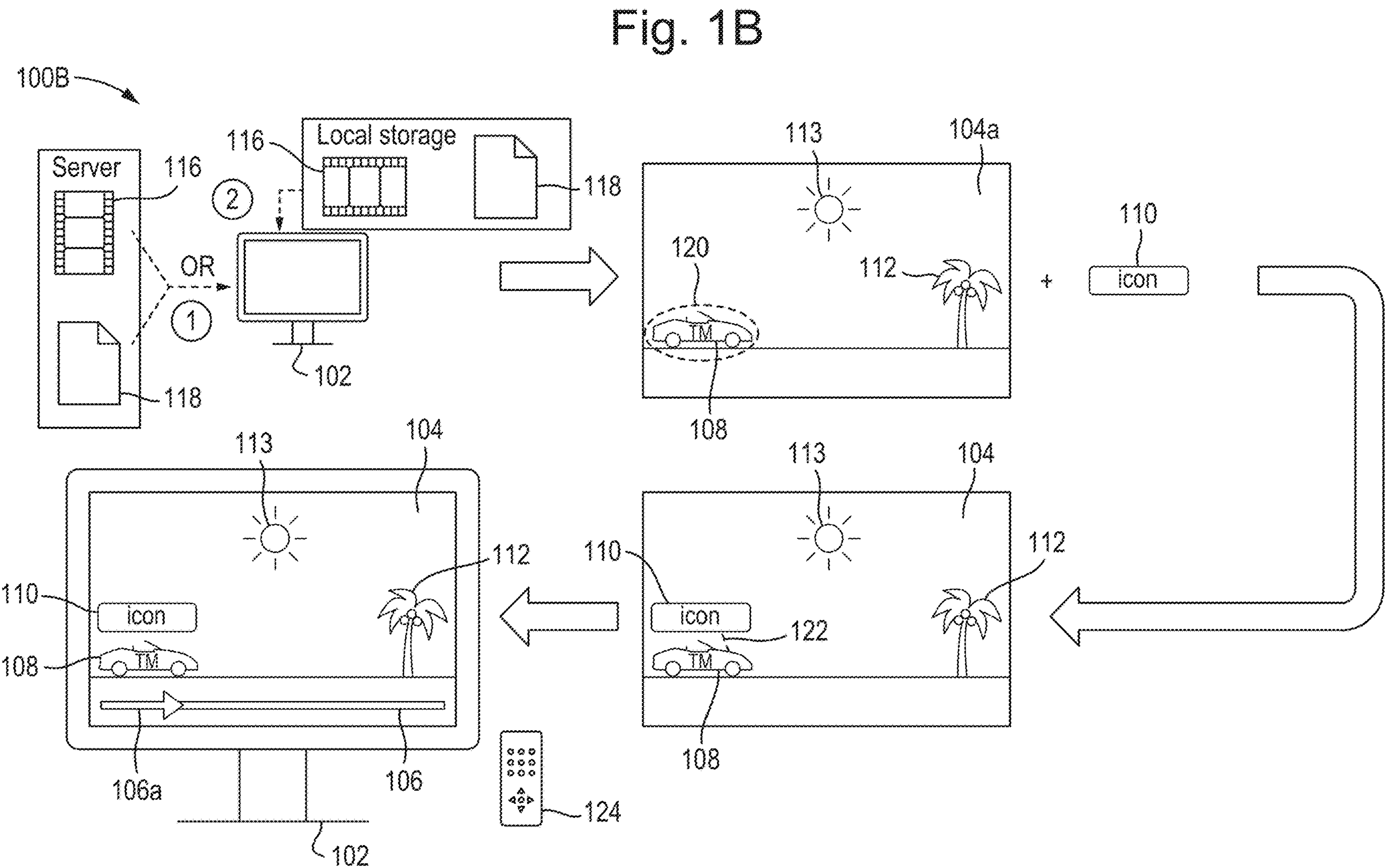
FIG. 1B represents an example for enabling an improved management of a buffer resource of a device during a presentation of a content item, in accordance with some implementations of the disclosure.

FIG. 1B represents an example 100B for enabling an improved management of a buffer resource of device 102 during a presentation of a content item, in accordance with some implementations of the disclosure. Example 100B comprises items from example 100A, e.g., device 102, composite frame 104, progress bar 106, progression point (or timestamp) 106*a*, 'TM' branded car 108, interactive element 110, palm tree 112, and sun 113. In some instances, established and/or possible details related to an item from example 100A apply to the item comprised in example 100B. Example 100B also comprises items other than items from example 100A, e.g., a frame 104*a* (e.g., obtained by decoding encoded segments 116), segments 116, data instructions 118, a region 120, a link 122 between interactive element 110 and 'TM' branded car 108, and remote control 124. In some instances, user device 102 may stream or download content, and modify the content following instructions from the server (being obtained through an analysis of the content conducted by an image analysis module run by the server) or an analysis implemented by the image analysis module run by user device 102.

In some instances, the content item is streamed or otherwise provided from the server to device 102. Device 102 requests and receives, from the server, a manifest associated with the content item. Device 102 requests, from the server, based on the manifest, segments 116 and data instructions 118 (e.g., metadata or data structure), both associated with the content item. Data instructions 118 may come from the content owner/provider/publisher or established by the image analysis module run by the server. Device 102 receives, from the server, encoded segments 116, places encoded segments 116 in a buffer, and decodes encoded segments 116 into one or more frames. Device 102 determines, based on data instructions 118, whether or not to combine, for each of the one or more frames, a frame with an interactive element (e.g., interactive element 110) to generate a composite frame. For example, device 102 determines, from data instructions 118, that frame 104*a* (obtained by decoding a segment 116) comprises region 120 comprising, in turn, a more or most important content element, the more or most important content element being 'TM' branded car 108. In some instances, region 120 of frame 104*a* may correspond to a region of a saliency map (established by the server using the image analysis module) corresponding to frame 104*a*. Device 102 determines, from data instructions 118, that interactive element 110 to be overlaid onto frame 104*a* is associated with the more or most important content element in frame 104*a*, which is depicted by link 122. In some instances, a position of interactive element 110 is associated, from data instructions 118, with region 120 comprising the more or most important content element, 'TM' branded car 108. Device 102 combines, based on data instructions 118, frame 104*a* with interactive element 110, to generate composite frame 104. Device 102 places in presentation buffer and presents unmodified frames and composite frames.

In some instances, the content item is streamed or otherwise provided from the server to device 102. Device 102 requests and receives, from the server, a manifest associated with the content item. Device 102 requests, from the server, based on the manifest, segments 116 associated with the content item. Device 102 receives, from the server, encoded segments 116, places encoded segments 116 in a buffer, and decodes encoded segments into one or more frames. Device 102 determines, using the image analysis module run at device 102, whether or not to combine, for each of the one or more frames, a frame with an interactive element (e.g., interactive element 110), to generate a composite frame (e.g., composite frame). For example, device 102 determines, using the image analysis module, that frame 104*a* (obtained by decoding a segment 116) comprises region 120 comprising, in turn, a more or most important content element, the more or most important content element being 'TM' branded car 108. In some instances, region 120 of frame 104*a* may correspond to a region of a saliency map (established by device 102 using the image analysis module) corresponding to frame 104*a*. Device 102 determines, from results of an analysis of frame 104*a* performed by the image analysis module, that interactive element 110 to be overlaid onto frame 104*a* is associated with the more or most important content element in frame 104*a*, which is depicted by link 122. In some instances, a position of interactive element 110 is associated, based on the results of the analysis of frame 104*a* performed by the image analysis module, with region 120 comprising the more or most important content element, 'TM' branded car 108. Device 102 combines, based on the results of the analysis of frame 104*a* performed by the image analysis module, frame 104*a* with interactive element 110 to generate composite frame 104. Device 102 finally places in presentation buffer unmodified frames and composite frames, and presents the unmodified frames and composite frames.

In some instances, the content item is downloaded from the server onto device 102. Device 102 requests and receives, from the server, a manifest associated with the content item. Device 102 requests, from the server, based on the manifest, segments 116 and data instructions 118 (e.g., metadata or data structure), both associated with the content item. Device 102 downloads, on a local storage (e.g., device memory), encoded segments 116 and data instructions 118. Device 102 requests, upon a user interface input, a presentation of the content item. Device 102 places encoded segments 116 in a buffer, and decodes encoded segments 116 into one or more frames. Device 102 determines, based on data instructions 118, whether or not to combine, for each of the one or more frames, a frame with an interactive element (e.g., interactive element 110) to generate a composite frame. For example, device 102 determines, from data instructions 118, that frame 104*a* (obtained by decoding a segment 116) comprises region 120 comprising, in turn, a more or most important content element, the more or most important content element being 'TM' branded car 108. In some instances, region 120 of frame 104*a* may correspond to a region of a saliency map (established by the server using the image analysis module) corresponding to frame 104*a*. Device 102 determines, from data instructions 118, that interactive element 110 to be overlaid onto frame 104*a* is associated with the more or most important content element in frame 104*a*, which is depicted by link 122. In some instances, a position of interactive element 110 is associated, from data instructions 118, with region 120 comprising the more or most important content element, 'TM' branded car 108. Device 102 combines, based on data instructions 118, frame 104*a* with interactive element 110, to generate composite frame 104. Device 102 finally places in presentation buffer and presents unmodified frames and composite frames.

In some instances, the content item is downloaded from the server onto device 102. Device 102 requests and receives, from the server, a manifest associated with the content item. Device 102 requests, from the server, based on the manifest, segments 116 associated with the content item. Device 102 downloads, on a local storage (e.g., device memory), encoded segments 116. Device 102 requests, upon a user interface input, a presentation of the content item. Device 102 places encoded segments 116 in a buffer, and decodes encoded segments 116 into one or more frames. Device 102 determines, using the image analysis module, whether or not to combine, for each of the one or more frames, a frame with an interactive element (e.g., interactive element 110) to generate a composite frame (e.g., composite frame 104). For example, device 102 determines, using the image analysis module, that frame 104*a* (obtained by decoding a segment 116) comprises region 120 comprising, in turn, a more or most important content element, the more or most important content element being 'TM' branded car 108. In some instances, region 120 of frame 104*a* may correspond to a region of a saliency map (established by device 102 using the image analysis module) corresponding to frame 104*a*. Device 102 determines, from results of an analysis of frame 104*a* performed by the image analysis module, that interactive element 110 to be overlaid onto frame 104*a* is associated with the more or most important content element in frame 104*a*, which is depicted by link 122. In some instances, a position of interactive element 110 is associated, based on the results of the analysis of frame 104*a* performed by the image analysis module, with region 120 comprising the more or most important content element, 'TM' branded car 108. Device 102 combines, based on the results of the analysis of frame 104*a* performed by the image analysis module, frame 104*a* with interactive element 110, to generate composite frame 104. Device 102 finally places in presentation buffer unmodified frames and composite frames and presents the unmodified frames and composite frames.

FIG. 1C depicts a set 100C of (example) interactive elements for enabling an improved management of a buffer resource of device 102 during a presentation of a content item, in accordance with some implementations of the disclosure.

In some instances, an example interactive element of set 100C of example interactive elements selected among 'skip' buttons 126*a*-126*g*, 'x % off' buttons 128*a*-128*g*, and 'OK' buttons 130*a*-130*g* may be overlaid, as interactive element 110, on one or more frames (e.g., frame 104*a*, or frame of the content item that is a precursor of composite frame 114, etc.) of the content item mentioned in the paragraphs related to FIGS. 1A-1B. In some instances, interactive element 110 may comprise a 'skip' button selected among 'skip' buttons 126*a*-126*g*. A function of the 'skip' button allows, upon a user interface input, for skipping at least a portion of one or more content items, if the 'skip' button is in an 'enabled' state before a receipt of the user interface input. Each of 'skip' buttons 126*a*-126*g* are different with each other in content and/or appearances. Hereinafter are peculiarities of 'skip' buttons 126*a*-126*g*. Each of 'skip' buttons 126*a*, 126*c*, and 126*e*-126*g* are in the 'enabled' state, while 'skip' button 126*b* in a 'disabled' state as indicated by a faded appearance of 'skip' button 126*b* corresponding to a transparency level above 0%. 'Skip' button 126*d* comprises a countdown indicating a duration during which 'skip' button 126*d* remains on the 'disabled' state before switching, at an end of the duration, to the 'enabled' state. 'Skip' button 126*c* comprises an outline, e.g., emphasized by a halo around the outline. 'Skip' buttons 126*e*-126*g* comprise a brand logo, a brand motto, and a brand product/service, respectively. In some instances, a 'skip' button of the 'skip' buttons 126*a*-126*g* may comprise at least one of a descriptive text 'skip', a faded appearance, a halo around an outline of the 'skip' button, a countdown, a brand logo, a brand motto and/or a brand product/service.

In some instances, interactive element 110 may comprise a 'x % off' button selected among 'x % off' buttons 128*a*-128*g*, with 'x' a real number belonging to an open interval between 0 and 100. A function of the 'x % off' button allows, upon a user interface input, for decreasing the price of a product/service of 'x' percentage of the price of the product/service, if the 'x % off' button is in an 'enabled' state before a receipt of the user interface input. For the sake of clarity, peculiarities of 'x % off' buttons 128*a*-128*g* are identical to the peculiarities of 'skip' buttons 126*a*-126*g*.

In some instances, interactive element 110 may comprise an 'OK' button selected among 'OK' buttons 130*a*-130*g*. A function of the 'OK' button allows, upon a user interface input, for implementing an action, if the 'OK' button is in an 'enabled' state before a receipt of the user interface input. For the sake of clarity, peculiarities of 'OK' buttons 130*a*-130*g* are identical to the peculiarities of 'skip' buttons 126*a*-126*g*.

Figure 2:
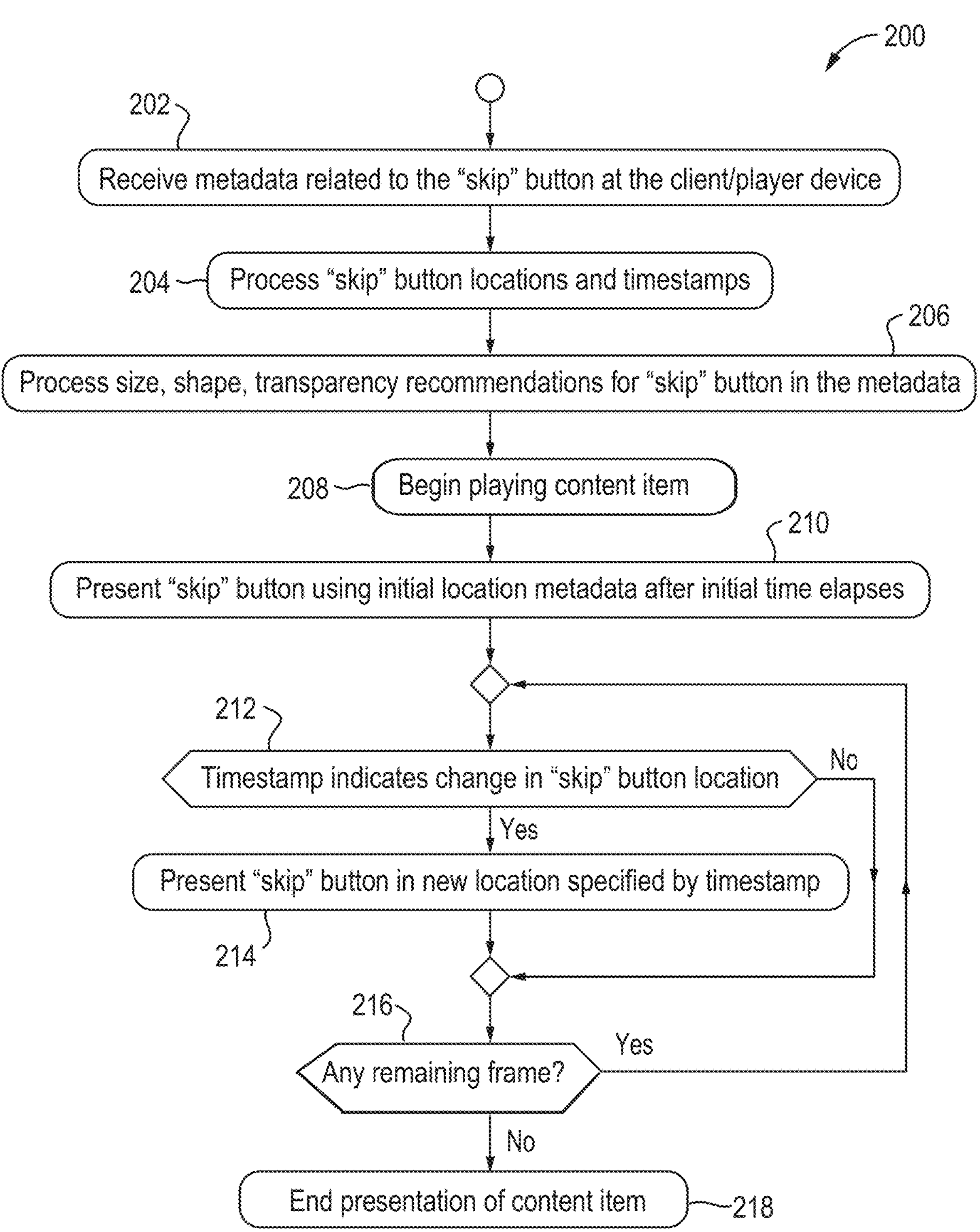
FIG. 2 illustrates an example flow diagram of illustrative steps involved in enabling an improved management of a buffer resource of a device during a presentation of a content item, in accordance with some implementations of the disclosure.

FIG. 2 illustrates an example flow diagram 200 of illustrative steps involved in enabling an improved management of a buffer resource of a device during a presentation of a content item, in accordance with some implementations of the disclosure. In some instances, the device (e.g., a user device, client device) may be in communication, via a communication network (e.g., LAN or WAN), with a server. In some instances, the device may stream or play, from the server, the content item using a player (e.g., a video player). The device may download from the server, and present using the player, the content item. In some instances, the content item may comprise at least one of a movie, a video clip or an ad. In some instances, the content item may be provided by an ad supplier (e.g., an ad content server, an ad supply side platform (ad SSP)). FIG. 2 describes how the player of the device receives and processes metadata to specify a position of a 'skip' button to be overlaid on one or more frames of the content item so as to generate one or more composite frames comprising each the 'skip' button. Process represented by flow diagram 200 may be implemented, in whole or in part, by any device mentioned throughout the specification (e.g., device 102, devices associated with FIGS. 2, 3, 4, 5, 6A-6E, 7A-7B, 8, 9, 10, 11, 13, and 14). In addition, one or more actions of the process 200 may be incorporated into or combined with one or more actions of any other processes or embodiments described herein. Although process 200 is implemented, for illustration, on an ad, process 200 can and may be applied to any content item (e.g., movie, video clip, etc.) in order to overlay an interactive element on one or more frames of the content item.

In some instances, an ad supplier (e.g., an ad content server, an ad SSP) may specify, using metadata, a position of a 'skip' button in one or more frames of the content item, the metadata being made available to a player of the device. Each frame of the one or more frames of the content item is associated with a respective timestamp (or progression point). A position of the 'skip' button may change during the content item by associating a timestamp or duration with each 'skip' button position. Additional metadata may also specify a recommended size, shape, transparency level, color range, content, function of the 'skip' button, and state (e.g., 'enabled' state, 'disabled' state). By specifying the 'skip' button position and other characteristics of the 'skip' button, the ad supplier places the 'skip' button wherever they believe will cause the user to recall the advertised product/service. To control the variability of the 'skip' button position, a video platform may provide guidelines or enforced rules, such as a minimum time that a 'skip' button must remain fixed in one position, or a total number of times that the 'skip' button position may be changed. The platform may also provide guardrails on the set of characteristics of the 'skip' button, comprising, location, size, shape, transparency level, color range, content, function/behavior, and state (e.g., 'disabled' or 'enabled' state) of the 'skip' button, such that if the ad supplier does not adhere to these specification ranges, then a default value may be chosen for one or more characteristics of the 'skip' button by the device to display the 'skip' button. The set of characteristics may be selected based on the content item to ensure harmony, e.g., such that the 'skip' button does not overshadow or obfuscate a salient or important content element, or content element of interest of the content item.

In some instances, a position of a 'skip' button may be specified independently of properties related to the content item, but dependently of properties (e.g., display resolution and size) of a display presenting the content item, while predictably defining the position and a size of the 'skip' button. For example, based on an aspect ratio of the player of the device, a suitable version of the content item is chosen and the position of the 'skip' button may be specified using normalized (X, Y) coordinates that represent the center of the 'skip' button. (X, Y) coordinate values may be normalized, based on maximal values of X and Y, each corresponding to one of a length and width of a display of the device. A maximum (normalized) radius of the 'skip' button may be specified to ensure that the 'skip' button, while maximizing proximity with a brand or product/service, does not interfere with key visual elements of the content item.

At step 202, the device receives metadata related to a 'skip' button, comprising, for each frame of one or more frames of the content item, a respective format tuple associated with the 'skip' button comprising, in turn, data, e.g., a timestamp (or progression point) associated with the frame and a set of characteristics associated with the 'skip' button in the frame. The set of characteristics of the 'skip' button may comprise, e.g., location, size, shape, transparency level, color range, content, function (or behavior), and state (e.g., 'disabled' state, 'enabled' state). For each frame of the one or more frames, each characteristic of the set of characteristics of the 'skip' button has a respective value (e.g., number with/without a unit, coordinates, or option) among available values. For example, a size of the 'skip' button may be determined based on a size of one or more content elements in a frame of the content item such that the 'skip' button does not overshadow or obfuscate the one or more content elements of the content item. For example, a size of the 'skip' button may be determined based on a size of a display that is to present the content item. For example, a transparency level of the 'skip' button may be expressed as a number in percentage and may depend on a state of the 'skip' button. The higher the percentage of the transparency level, the more transparent or faded the 'skip' button appears, the more likely the 'skip' button is in a 'disabled' state. The lower the percentage of the transparency level, the more opaque the 'skip' button appears, the more likely the 'skip' button is in an 'enabled' state. For example, a location of the 'skip' button may be expressed as coordinates in a frame. For example, a shape of the 'skip' button may be expressed as a square, a disc, rectangle, rounded rectangle, etc. For example, each pixel of the 'skip' button may have a respective color. The 'skip' button may have a range of colors that comprises one or more colors, each color being associated with coordinates in a color-related referential (e.g., as in RGB color model). For example, the content of the 'skip' button (e.g., presented to a user) may comprise an outline, a background, and one or more objects, that are enclosed in the outline and overlaid on the background. In some instances, a pixel of the outline may have a color different from a pixel of the background and/or the one or more objects. In some instances, a pixel of the outline may have a same color as a pixel of the background and/or the one or more objects. The one or more objects may comprise, e.g., a text associated with the function of the 'skip' button, a brand logo, a trade mark, a brand motto, a product and/or service, related to a company. Therefore, the adaptable or dynamic aspect of the 'skip' button results from the possibility to impart, across frames of the one or more frames of the content item, a change in value for one or more characteristics of the set of characteristics of the 'skip' button. In some instances, a first format tuple associated with a first frame and a second format tuple associated with a second frame cannot be distinguished based on orders of data in the first format tuple and the second format tuple. In some instances, at least a characteristic of a set of characteristics of the 'skip' button associated with a first frame of the one or more frames of the content item may be different in value from a corresponding at least a characteristic of a set of characteristics of the 'skip' button associated with a second frame of the one or more frames of the content item, the first frame being different from the second frame. In some instances, at least a characteristic of a set of characteristics of the 'skip' button associated with a first frame of the one or more frames of the content item may be identical in value from a corresponding at least a characteristic of a set of characteristics of the 'skip' button associated with a second frame of the one or more frames of the content item, the first frame being different from the second frame. In some instances, there may be no format tuple associated with a frame of the content item when no 'skip' button is to be overlaid on the frame to form a composite frame, the frame being different from the one or more frames of the content item.

(In some instances, a format tuple associated with a frame of the content item may be empty when no 'skip' button is to be overlaid on the frame to form a composite frame, the frame being different from the one or more frames of the content item.) In some instances, the content item comprises the one or more composite frames, and may comprise original frames of the content item, for which the metadata did not instruct the device to generate for display a corresponding composite frame. In some instances, a value of a characteristic of the set of characteristics may be selected, for a plurality of frames, among available values, e.g., arranged in wheel of fortune, wherein the values may be fixed or alternated in a round robin fashion. The device proceeds to step 204.

At step 204, the device retrieves, from the metadata, location(s) of the 'skip' button across the one or more frames of the content item. The device proceeds to step 206.

At step 206, the device retrieves, from the metadata, size(s), shape(s), transparency level(s), color range(s), content(s), function(s) of the 'skip' button, and state(s) (e.g., 'enabled' state, 'disabled' state), across the one or more frames of the content item. The device proceeds to step 208.

At step 208, the device starts, upon a user interface input, presentation of the content item. The device proceeds to step 210.

At step 210, the device starts generating for display, based on a first frame of the one or more frames of the content item and a format tuple associated with the first frame of the one or more frames, a first composite frame comprising the 'skip' button overlaid on the first frame at a first position. The device presents the first composite frame of the one or more composite frames, comprising the 'skip' button at the first position in the first composite frame. The device proceeds to step 212.

At step 212, the device determines, based on a timestamp or progression point associated with a second frame of the one or more frames, that the second frame is to be presented next to the first frame. The device determines whether there is a change in the 'skip' button location from the first position in the first composite frame to a second position in a second composite frame resulting from overlaying the 'skip' button on the second frame following the format tuple associated with the second frame. The device determines whether the second position is different from the first position. If so, the device proceeds to step 214. If not, the device starts generating for display, based on the second frame of the one or more frames of the content item and the format tuple associated with the second frame of the one or more frames, the second composite frame comprising the 'skip' button overlaid on the second frame at the first position (since the first position and second position are identical to each other), and proceeds to step 216.

At step 214, the device starts generating for display, based on the second frame of the one or more frames of the content item and the format tuple associated with the second frame of the one or more frames, the second composite frame comprising the 'skip' button overlaid on the second frame at the second position. The device proceeds to step 216.

At step 216, the device presents the second composite frame irrespective of the position of the 'skip' button (e.g., the first position if the second position is identical to the first position when the device proceeds to step 216 from step 212, or the second position if the second position is different from the first position when the device proceeds to step 216 from step 214). The device determines whether (1) there is at least a remaining frame of the content item to present and (2) the at least remaining frame is from the one or more frames of the content item (on which the 'skip' button is overlaid). If both events (1) and (2) are true, the at least a remaining frame is to accommodate the 'skip' button at a third position to generate for display a third composite frame and the device reverts to step 212. If both events (1) and (2) are both false, the at least a remaining frame has run out, and the device proceeds to step 218. If the event (1) is true and the event (2) false, the device presents the at least a remaining frame without overlaying the 'skip' button on the at least remaining frame and the device re-does step 216.

At step 218, the device ends the presentation of the content item, e.g., when a user interface input interacts with the 'skip' button (in an 'enabled' state), or the at least a remaining frame of the content item has run out.

FIG. 3 shows an example flow diagram 300 of illustrative steps involved in enabling an improved management of a buffer resource of a device during a presentation of a content item, in accordance with some implementations of the disclosure. In some instances, the device (e.g., a user device, client device) may be in communication, via a communication network (e.g., LAN or WAN), with a server. In some instances, the device may stream or play, from the server, the content item using a player (e.g., a video player). The device may download from the server, and present using the player, the content item. In some instances, the content item may comprise at least one of a movie, a video clip or an ad. FIG. 3 describes how the player of the device selects a position for a 'skip' button to be overlaid on one or more frames of the content item so as to generate one or more composite frames comprising each the 'skip' button. Process represented by flow diagram 300 may be implemented, in whole or in part, by any device mentioned throughout the specification (e.g., device 102, devices associated with FIGS. 2, 3, 4, 5, 6A-6E, 7A-7B, 8, 9, 10, 11, 13, and 14). In addition, one or more actions of the process 300 may be incorporated into or combined with one or more actions of any other processes or embodiments described herein. Process 300 can and may be applied to any content item (e.g., movie, video clip, etc.) in order to overlay an interactive element on one or more frames of the content item.

At step 302, the device receives, from the server, at least a portion of encoded segments of the content item selected for presentation, via a user interface input or by a content provider. The device decodes the at least a portion of encoded segments into frames of the content item. The device proceeds to step 304.

At step 304, the device selects a first frame of one or more frames of the content item, on which the 'skip' button is to be overlaid to generate a first composite frame. The device proceeds to step 306.

At step 306, the device identifies, using an image analysis module, one or more first regions in the first frame, whose first saliency score (e.g., a visual saliency score) exceeds a first threshold saliency score (e.g., a threshold visual saliency score). In some instances, the device may establish, using the image analysis module, a saliency map associated with the first frame. The device proceeds to step 308.

At step 308, the device selects a technique, e.g., optical character recognition (OCR), to identify graphical information (e.g., text) in the first frame of the content item and determine one or more second regions of the first frame comprising at least a portion of the graphical information. The device proceeds to step 310.

At step 310, the device determines whether the graphical information has been identified in the first frame of the content item. If so, the device proceeds to step 312. If not, the device proceeds to step 316.

At step 312, the device determines the one or more second regions, whose second saliency score (e.g., a semantic saliency score or a brand saliency score) exceeds a second threshold saliency score (e.g., a threshold semantic or brand saliency score). If it is not the case, the device proceeds to step 316. If it is the case, the device proceeds to step 314. In some instances, the second threshold saliency score may be different from or identical to the first threshold saliency score.

At step 314, the device selects, to position the 'skip' button, a periphery of the one or more second regions or a periphery of a second region of the one or more second regions. In some instances, the second region of the one or more second regions may have a higher or highest second saliency score among the one or more second regions. In some instances, the second saliency score of the one or more second regions is considered higher than the first saliency score of the one or more first regions since the first saliency score and second saliency score are related to visual saliency, and semantic saliency or brand saliency, respectively. The device proceeds to step 316.

At step 316, the device selects a periphery of the one or more first regions or a periphery of a first region of the one or more first regions. In some instances, the first region of the one or more first regions may have a higher or highest first saliency score among the one or more first regions. In some instances, the device may select a position within the first region of the one or more first regions, e.g., when the 'skip' button does not obfuscate the first region of the one or more first regions. The device proceeds to step 318.

At step 318, the device generates for presentation the first composite frame by overlaying the 'skip' button into the first frame of the one or more frames of the content item, in a position that may be at the periphery of (or in proximity to) or within the selected first region or the selected one or more first regions, or at the periphery of (or in proximity to) the selected second region or the selected one or more second regions. The device places, in a play buffer, the first composite frame prior to a presentation of the first composite frame. The device determines whether a second frame, that has not been processed to become a second composite frame, of the one or more frames of the content item may remain. If so, the device reverts to the step 306. If not, the device proceeds to step 320.

At step 320, the device ends generating for presentation composite frames.

As shown in FIG. 3, the device may select a location of the 'skip' button at the periphery of (or in proximity to) a region (e.g., a salient or important region, a region having properties to "catch" the eye of a user) of a frame of the one or more frames of the content item, the frame having a saliency score exceeding a threshold saliency score. The saliency in 'saliency score' may be defined as a visual saliency or a 'brand saliency' metric that represents a brand/logo of a product/service. Using 'brand saliency' to position the 'skip' button at the periphery of (or in proximity to) a salient region may improve user recall of the advertised product/service, thereby improving impression of the advertised product/service on the user. In FIG. 3, the device may identify one or more salient (or important) regions in a frame, using, for example, a saliency model to develop a saliency map. The device may identify text in the frame. If an identified text region is also a salient region, then the identified text region may be inferred to have brand saliency. The 'skip' button may therefore be placed preferentially at the periphery of (or in proximity to) the identified text region. If the device does not identify a region having brand saliency, then another region with high saliency score may be used to anchor the 'skip' button at a periphery of (or in proximity to) the other region. The 'skip' button may be placed within the salient region if the 'skip' button does not obfuscate the salient region. In some instances, the device may use another saliency model that accounts for both text and visual saliency to determine a salient (or important) region for positioning the 'skip' button on the frame of the one or more frames of the content item.

Figure 4:
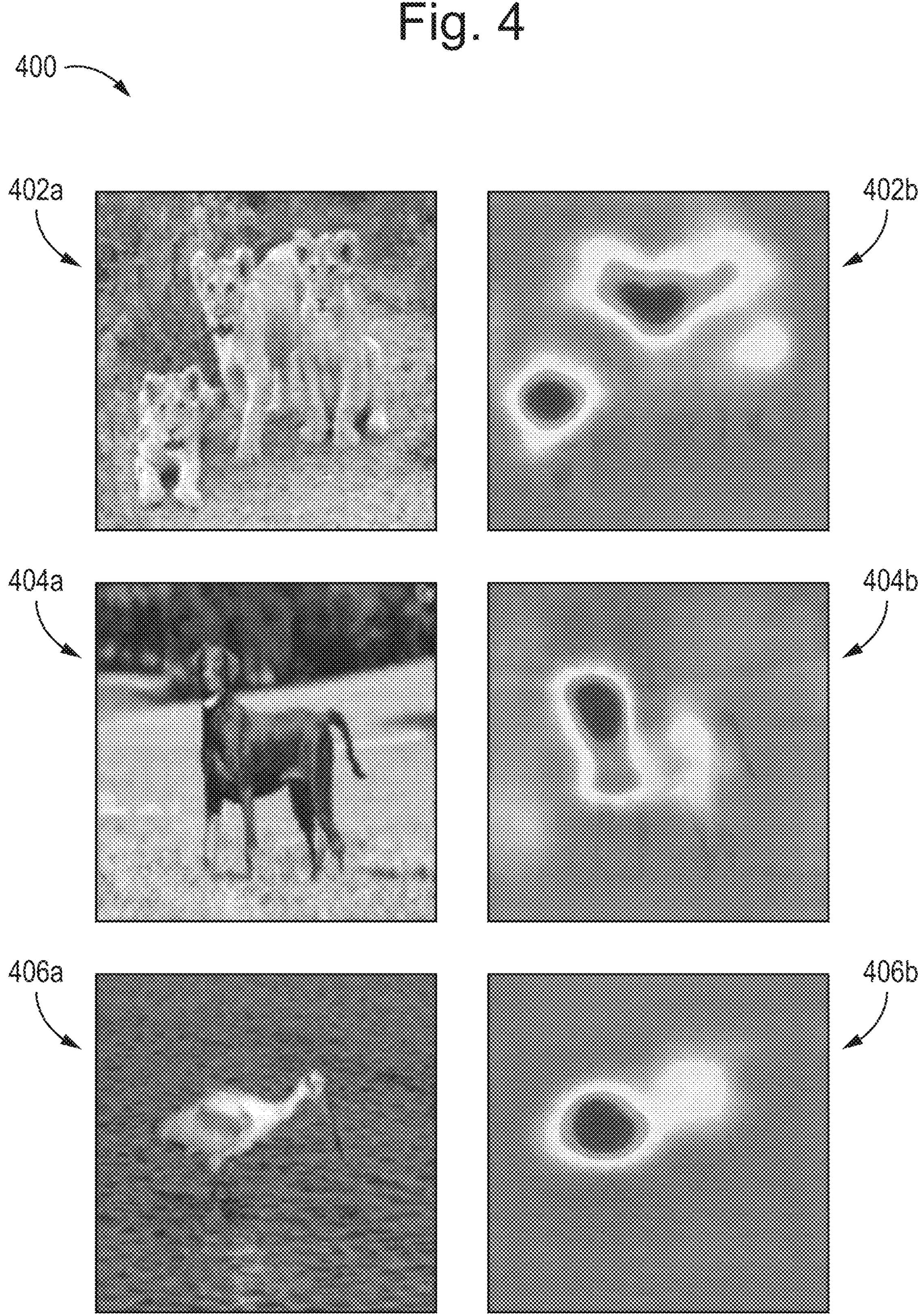
FIG. 4 represents a set of multiple example frames of a content item and multiple example saliency maps associated with the multiple example frames, for enabling an improved management of a buffer resource of a device during a presentation of the content item, in accordance with some implementations of the disclosure.

FIG. 4 represents a set 400 of multiple example frames 402*a*, 404*a* and 406*a* of a content item, and multiple example saliency maps 402*b*, 404*b* and 406*b* associated with the multiple example frames, for enabling an improved management of a buffer resource of a device during a presentation of the content item, in accordance with some implementations of the disclosure. In some instances, the device (e.g., a user device, client device) may be in communication, via a communication network (e.g., LAN or WAN), with a server. In some instances, the device may stream or play, from the server, the content item using a player (e.g., a video player). The device may download from the server, and present using the player, the content item. In some instances, the content item may comprise at least one of a movie, a video clip or an ad.

In some instances, a saliency map may identify regions of an image (e.g., frame) on which human sight is likely to focus based on visual features such as spatial region (e.g., central objects are more salient than peripheral objects), contrast (e.g., a red bird in a green tree is more salient than a green bird in a green tree), and color (e.g., a red chair is more memorable than a beige chair).

In some instances, saliency maps may be established by the device or server using an image analysis module. In some instances, the device or server may use the saliency maps to position an interactive element (e.g., a 'skip' button, a 'x % off' button, an 'OK' button, etc.), e.g., outside, at the periphery of, in proximity to, or within (if the interactive element does not obfuscate where the interactive element is positioned) a region (e.g., an important or salient region, or a region of interest) whose saliency score exceeds a threshold saliency score. In some instances, the region may comprise at least a content element of a frame. In some instances, the server may convert a saliency map into metadata, the device can use to position the interactive element in frames of the content item. In some instances, the device may convert a saliency map into metadata to position the interactive element in frames of the content item. By positioning (e.g., dynamically) the interactive element relative to a salient or important region (or a region of interest), the device or server may divert a user's attention from the salient or important region (or the region of interest) to the interactive element such that the interactive element may retain it for a duration of the presentation of the content item. This may extend the presentation of the content item that would have otherwise ceased earlier had the interactive element not been positioned relative to the salient or important element (or the region of interest), e.g., but simply positioned at a default position on a display without taking account of content elements of the content item. Further buffered segments of the content item would be accordingly presented, improving the management of a buffer resource of the device presenting the content item.

In saliency maps 402*b*, 404*b* and 406*c*, a saliency score of a pixel is indicated by a color of the pixel. The darker the pixel color, the higher the saliency score. Aggregates of pixels of identical or similar color form regions.

Frame 402*a* represents three adolescent lions located on a grass patch. A first adolescent lion lying on grass is positioned in a lower left corner of frame 402*a*, slightly apart from the second and third adolescent lions, which are close to each other and occupy the central portion of frame 402*a*. Saliency map 402*b* comprises a darkest region corresponding to a head of the first adolescent lion, a first darker region corresponding to a region in between a head of the second adolescent lion and a head of the third adolescent lion, and a first moderately dark region corresponding to a top portion of a leg of the third adolescent lion. The darkest region is surrounded by a second moderately dark region corresponding to a portion of a body of the first adolescent lion. The first darker region is surrounded by a third moderately dark region, which comprises a portion of the heads of the second and third adolescent lions and a part of a body of the second adolescent lion.

Frame 404*b* depicts a dog standing on grass. Saliency map 404*b* comprises a darkest region corresponding to a head of the dog, surrounded by moderately dark region corresponding to a main portion of a body of the dog.

Frame 406*b* depicts a profile view of a bird, whose non-spanned large wing exhibits vivid colors, walking through a waterbody and possibly foraging small fishes and mollusks. Saliency map 406*b* comprises a darkest region corresponding to the large wing, surrounded by moderately dark region corresponding to a neck and head of the bird.

In some instances, in addition to visual saliency, the server or device may perform semantic segmentation, a computer vision technique that assigns a class label to each pixel in an image, the class label being, e.g., a specific object, a specific part of a specific object or a background region. The server or device may then identify contextually salient regions to further improve the saliency map. When determining semantic saliency, the server or device may consider features such as identity (e.g., dynamite is more memorable than dirt), human faces or body parts, atypicality (e.g., an apple sliced open, that is indeed a cake as shown a Netflix® show entitled 'Is It Cake?' ®, a cake in a shower, or a kitten whose size is equal to a size of a house), or emotional valence (e.g., a frightened face is more memorable than a bored face).

The server or device may identify "brand saliency" by training an image analysis model on assets associated with a brand, for example, registered or unregistered industrial designs, registered or unregistered trade marks, logos, mottos, ads, etc. Such assets may be 2D (e.g., logo, product silhouette) or 3D (e.g., Coca Cola® bottle, glasses style). When determining saliency throughout a video, the server or device may select frames for which to construct saliency maps at a fixed rate (e.g., 1 Hz), or the server or device may apply existing video event detection techniques to select significant moments within the video and construct saliency maps for those frames.

FIG. 5 depicts a set 500 of multiple example frames (e.g., portions of a content item or portions of respective content items) for enabling an improved management of a buffer resource of a device during a presentation of the content item, in accordance with some implementations of the disclosure. In some instances, a device (e.g., a user device, client device) may be in communication, via a communication network (e.g., LAN or WAN), with a server. In some instances, the device may stream or play, from the server, the content item using a player (e.g., a video player). The device may download from the server, and present using the player, the content item. In some instances, the content item may comprise at least one of a movie, a video clip or an ad. In some instances, the content item comprises an example ad pod as shown in FIG. 5. An ad pod is a plurality of ads that are presented sequentially.

Set 500 comprises a first frame 502, a second frame 504 and a third frame 506, that are to be sequentially presented in a following order: first frame 502, second frame 504 and third frame 506. Each of first frame 502, second frame 504 and third frame 506 is skippable and comprises a 'skip' button (e.g., 'skip' button 502a, 504a or 506a) positioned in, e.g., a default position of a frame of a frame (e.g., first frame 502, second frame 504, third frame 506), such as lower right corner of the frame.

During a presentation of first frame 502, the device receives a user interface input interacting with 'skip' button 502a (which is in an 'enabled' state). The device interrupts the presentation of first frame 502 and starts a presentation of second frame 504 along with a presentation of 'L'-shaped ribbon (or overlay banner) 502b associated with first frame 502. To do so, second frame 504 is scaled down to leave enough space on a display for 'L'-shaped ribbon (or an overlay banner) 502b to be concomitantly presented as a reminder of first frame 502. 'L'-shaped ribbon (or overlay banner) 502b comprises content elements of first frame 502, e.g., name of the product for sale (such as 'TIRE DISCOUNT'), part of a design (such as triangles). L'-shaped ribbon (or overlay banner) 502b also comprises a QR code 502c to access, on a portable device (e.g., mobile phone, tablet, laptop) able to read QR code 502c, a website related to the product for sale, or start the presentation of first frame 502 on the portable device. In some instances, 'L'-shaped ribbon (or overlay banner) 502b may be interactive to restart the presentation of first frame 502.

Similarly, during the presentation of second frame 504, the device receives a user interface input interacting with 'skip' button 504a (which is in an 'enabled' state). The device interrupts the presentation of second frame 504a and starts a presentation of third frame 506 along with a presentation of 'L'-shaped ribbon (or overlay banner) 504b associated with second frame 504. To do so, third frame 506 is scaled down to leave enough space on a display for 'L'-shaped ribbon (or an overlay banner) 504b to be concomitantly presented as a reminder of second frame 504. 'L'-shaped ribbon (or overlay banner) 504b comprises content elements of second frame 504, e.g., name of the product for sale (such as 'ORIGINAL ENGINE OIL'), part of a design (not shown here). L'-shaped ribbon (or overlay banner) 504b also comprises a QR code 504c to access, on the portable device able to read QR code 504c, a website related to the product for sale or restart the presentation of second frame 504 on the portable device. In some instances, 'L'-shaped ribbon (or overlay banner) 504b may be interactive to restart the presentation of second frame 504.

In some instances, an ad pod may contain N+1 skippable ads with N being a natural integer above zero. The device may receive a user interface input interacting with a 'skip' button (in an 'enabled' state) during presentation of an ad 'N', which may cause an ad 'N+1' consecutive to the ad 'N' in the ad pod, to be scaled down to leave enough space on a display for an 'L'-shaped ribbon (or an overlay banner) to be concomitantly presented as a reminder of the ad 'N'.

About Signaling from a Publisher

In some instances, a content item platform (e.g., an ad platform) may indicate, at a publisher, that characteristics (e.g., location, size, shape, transparency level, color range, content, function/behavior, and state (e.g., 'disabled' state, 'enabled' state)) of a 'skip' button may be controlled by a player (e.g., media player) of a device, by returning a data structure that includes specific fields for the characteristics of the 'skip' button). Although the signaling example below relates, for illustration, to an ad, teachings associated with the signaling example can and may be applied to any content item (e.g., movie, video clip, etc.) in order to overlay an interactive element on one or more frames of the content item.

For example, an application programming interface (e.g., Google®'s dynamic ad insertion (DAI) API) may return a stream JSON structure as follows:

```
{
"stream_id": string,
"total_duration": number,
"content_duration": number,
"valid_for": string,
"valid_until": string,
"subtitles": [object(Subtitle)],
"hls_master_playlist": string,
"stream_manifest": string,
"media_verification_url": string,
"apple_tv": object(AppleTV),
"ad_breaks": [object(AdBreak)],
}
```

The "ad_breaks" structure contains objects "ad" as illustrated below:

```
{
"type": string,
"start": number,
"duration": number,
"ads": [object(Ad)],
}
```

The Ad object structure defines the creative as follows:

```
{
"seq": number,
"start": number,
"duration": number,
"title": string,
"description": string,
"advertiser": string,
"ad_system": string,
"ad_id": string,
"creative_id": string,
"creative_ad_id": string,
"deal_id": string,
"clickthrough_url": string,
"icons": [object(Icon)],
"wrappers": [object(Wrapper)],
"events": [object(Event)],
"verifications": [object(Verification)],
"universal_ad_id": object(UniversalAdID),
"companions": [object(Companion)],
"interactive file": object(InteractiveFile),
"skip_metadata": object(SkipMetadata),
}
```

The skip_metadata object may then be modified from current practice to include control information for skip-buttons in skippable ads:

{
"offset": number, ← indicates an amount of time in seconds into the ad the player should wait to render the 'skip' button (existing field)
"tracking_url": string, ← contains a URL that should be pinged on a skip event (existing field)
"skip_position": enum, ← indicates how the player renders the 'skip' button. Allowed are "fixed", "dynamic", "salient". The term "fixed" means that the player selects a default position in a frame for the 'skip' button such as lower right corner of the frame. The term "dynamic" means that the player dynamically adjusts a position of the 'skip' button. The term "salient" means that a position of the 'skip' button is selected based on average saliency information in frames (e.g., video frames) of the content item (e.g., ad), that ought to include the 'skip' button.

"saliency_center": table, ←(optional) if the table (e.g., saliency table) is empty, the player computes saliency information to position the 'skip' button in one or more frames of the content item. If the table is not empty, the player uses coordinates in the table to position the 'skip' button in the one or more frames. The table contains saliency coordinates for frame past "offset". In some instances, coordinates are relative to the top left corner and relative to width and height. For example, coordinates (0.5, 0.5) are the coordinates of a frame middle.

"saliency_granularity": number, ← if the table is not empty, indicates a frame range in which saliency coordinates apply: 1 means every frames, 2 means once every two frames, etc.

}

In some instances, a player (e.g., media player) of a device may receive an instruction to overlay a QR code or any other form of interactable widget on top of an ad (e.g., video ad) creative while showing an ad. In an advanced television systems committee 3.0 standard (ATSC3.0) situation, a connected TV (CTV) may decode a watermark indicative of an ad break and fetch ad creatives from a first network while getting personalized offer based on these ads and the subscriber/viewer from a second network. The CTV may receive a data structure (e.g., similar to the one described above) to indicate where in an ad creative the QR code may be overlayed. The data structure may indicate whether the CTV may compute or not a saliency map of the ad creative to select a position of the QR code, e.g., at the periphery of or in proximity to a salient part of the ad creative. Contrary to the 'skip' button example, where moving the 'skip' button in concert with one or more salient regions of a creative makes sense, a QR code should remain static to be easily captured by a viewer using a mobile device such as a smartphone. In consequence, the CTV may determine one or more salient regions over a duration of the ad creatives during which a QR code is requested to be overlayed, and position the QR code at a fixed position based on the one or more salient regions. For example, the CTV may determine a position of the QR code, e.g., that is exclusive of the one or more salient regions in the ad creatives while minimizing a distance between the QR code and the one or more salient regions. In some instances, the CTV may receive a pre-determined saliency map and/or a pre-determined QR code position in one or more frames of the ad.

Having a CTV or other player select an optimal position for a personalized QR code placement is superior to current art which consists in shrinking an ad creative and adding the QR code in a position outside the creative (such as in a L-shaped banner) as it allows for an undisrupted experience of the ad creative. In some instances, the player may include a 'skip' or 'x' button (the x in 'x' being a word, a term, an expression or a sentence) displayed onto an ad from a start of a presentation of the ad. Initially, the 'skip' or 'x' button is in a 'disabled' state and appears less noticeable than a 'skip' or 'x' button in an 'enabled' state. For instance, the 'skip' or 'x' button in a 'disabled' state appears as semi-transparent or smaller in size than the 'skip' or 'x' button in the 'enabled' state. A position of the 'skip' or 'x' button may be associated with one or more salient regions (detected/tracked, or predetermined using metadata or data structure). Alternatively, the 'skip' or 'x' button may follow a trajectory (e.g., a saliency-related trajectory) designed to draw the user's attention to the one or more salient regions. Once the ad becomes skippable, the 'skip' or 'x' button in the 'disabled state' may transition to the 'enabled' state and appear as fully visible or larger in size. In some instances, since a visual guide, e.g., a 'skip' button following a saliency-related trajectory in an ad, can help capture viewers' attention and enhance the ad's effectiveness, similar visual guides, such as a semi-transparent halo or other subtle visual enhancements, may be added to any ad, along the real time detected and tracked saliency trajectory or any pre-determined trajectory, to improve user engagement and focus. In some instances, a publisher may indicate, via signaling or metadata, a position of the 'skip' or 'x' button, based on which region or content element in a frame that they want to draw attention. The region or content element in the frame may comprise text or an object.

FIGS. 6A-6E illustrate each an example display, e.g., example screen 600A, 600B, 600C, 600D, 600E, respectively, for enabling an improved management of a buffer resource of a device during a presentation of a content item, in accordance with some implementations of the disclosure. In some instances, the device (e.g., a user device, client device) may be in communication, via a communication network (e.g., LAN or WAN), with a server. In some instances, the device may stream or play, from the server, the content item using a player (e.g., a video player). The device may download from the server, and present using the player, the content item. In some instances, the content item may comprise at least one of a movie, a video clip or an ad. In some instances, as shown in FIGS. 6A-6E, the content item is included in example screens 600A, 600B, 600C, 600D, 600E, as composite frames 602A, 602B, 602C, 602D, 602E, respectively.

Each of example screen 600A, 600B, 600C, 600D, 600E comprises a banner 601 and a composite frame (e.g., composite frame 602A, 602B, 602C, 602D, 602E, respectively), banner 601 partially surrounding the composite frame. Banner 601 comprises a first text region "Automatic Skip Ad 'TM'" to describe the content item that is presented. Each of the composite frames (e.g., composite frame 602A, 602B, 602C, 602D, 602E) comprises a new car 606 of brand 'TM' (having a novel direct shift gearbox (DSG)) positioned in a middle of the composite frame, a text 604 (e.g., "New 'TM' Car with novel DSG—Automatically changes gears and skips ads for you"), and a respective 'skip' button (e.g., 'skip' button 608A, 608B, 608C, 608D, or 608E, respectively). The position of the 'skip' button differs across composite frames 602A, 602B, 602C, 602D, 602E. The position of each of 'skip' button (e.g., 'skip' button 608A, 608B, 608C, 608D, 608E) in the corresponding composite frames (e.g., composite frame 602A, 602B, 602C, 602D, 602E) may be determined by, e.g., a content provider (e.g., OTT platforms, an ad supplier, an ad content server, an ad SSP, etc.), the server, or the device.

Figure 6A:
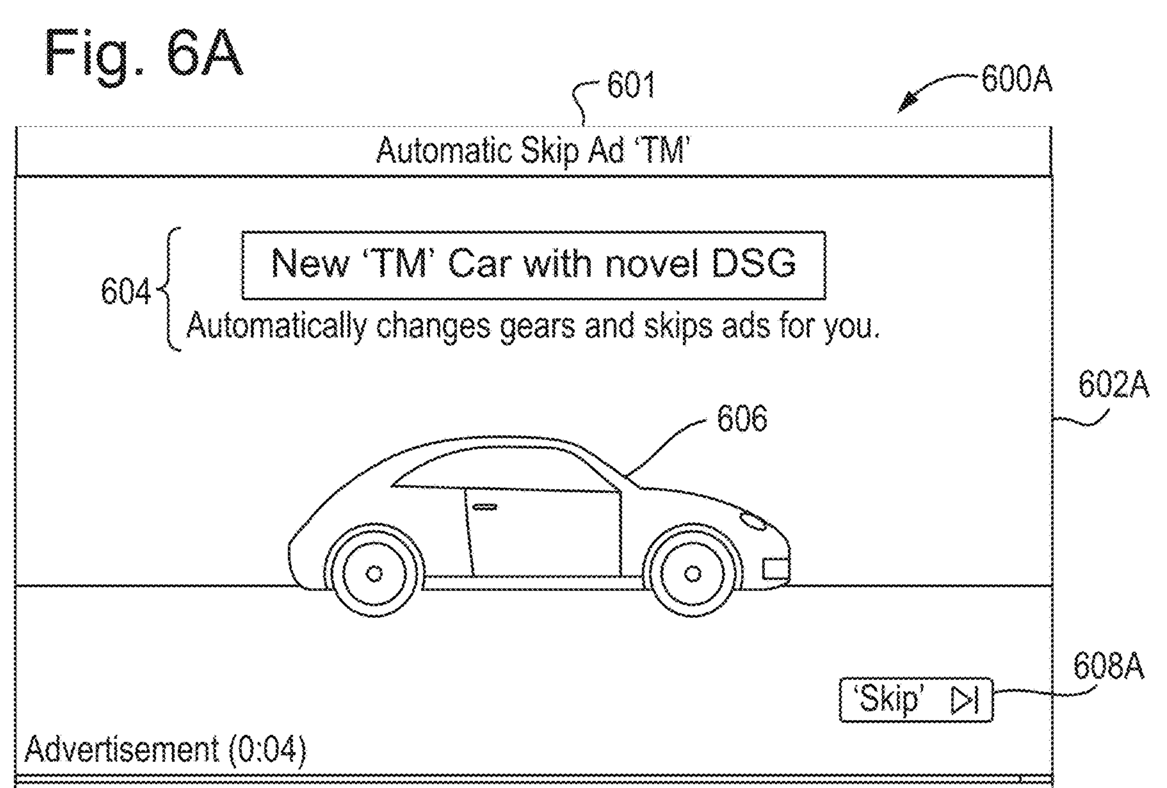
FIGS. 6A-6E illustrate each an example screen for enabling an improved management of a buffer resource of a device during a presentation of a content item, in accordance with some implementations of the disclosure.
Figure 6B:
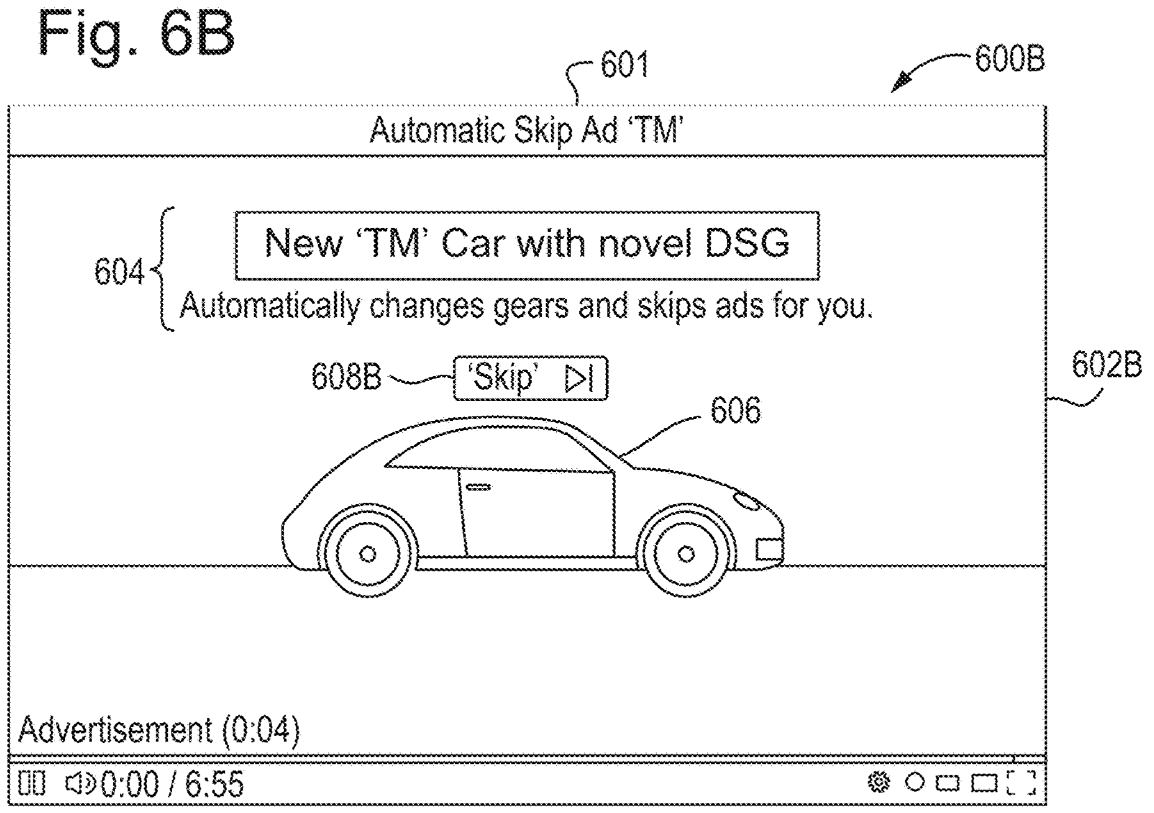
Figure 6C:
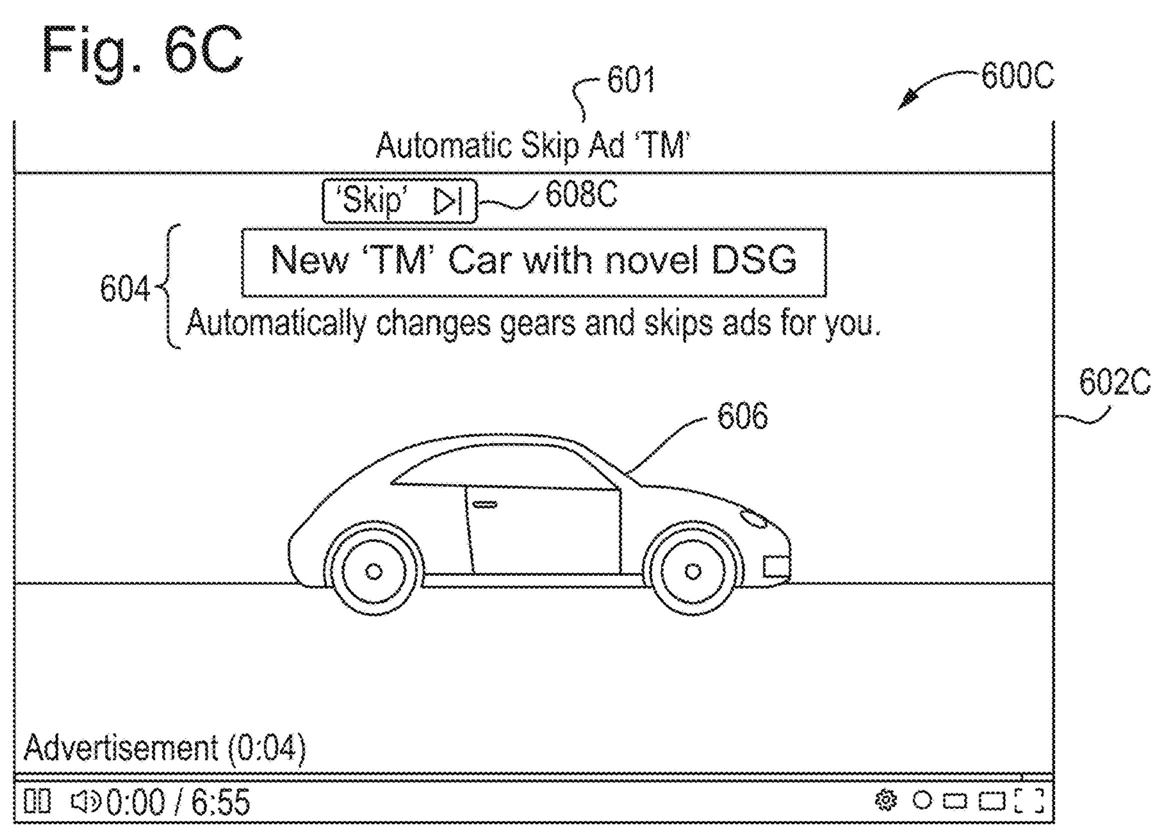
Figure 6D:
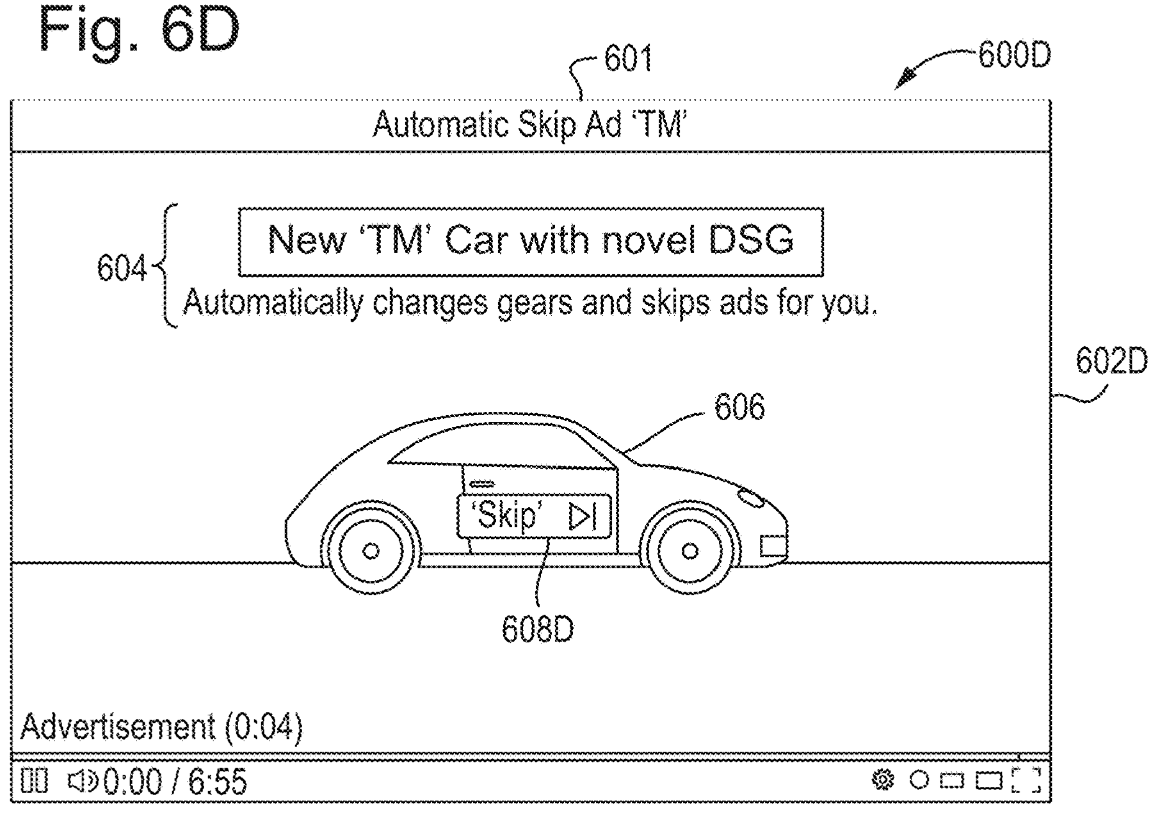
Figure 6E:
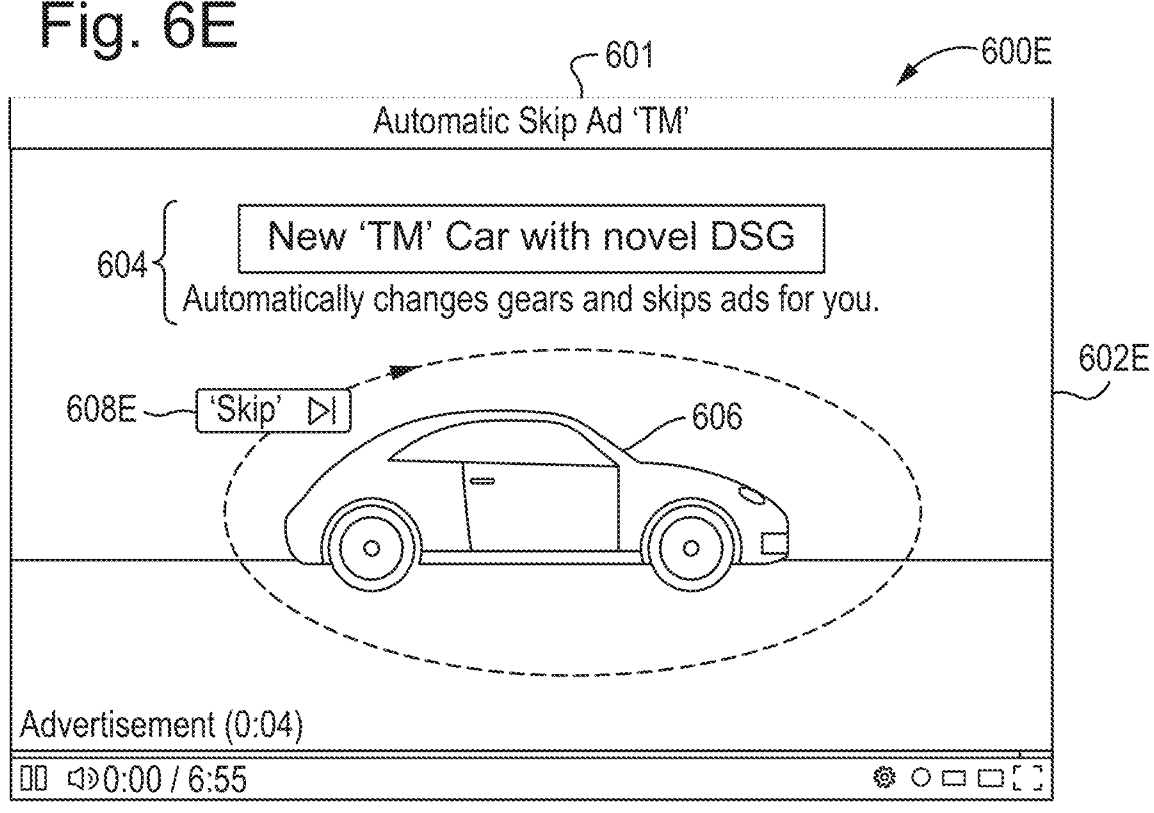

In FIG. 6A, 'skip' button 608A is positioned, in composite frame 602A, at a default position, e.g., lower right corner of composite frame 602A. In FIG. 6B, 'skip' button 608B is positioned, in composite frame 602B, at a position above a position of new car 606, e.g., preferentially at the periphery of or in proximity to new car 606, the advertised product. In FIG. 6C, 'skip' button 608C is positioned, in composite frame 602C, at a position above text 604, e.g., preferentially at the periphery of or in proximity to the brand 'TM'. In FIG. 6D, 'skip' button 608D is positioned, in composite frame 602D, at a position within new car 606, e.g., preferentially where 'skip' button 608D does not obfuscate new car 606, the advertised product. In FIG. 6E, 'skip' button 608E is positioned, in composite frame 602E, at a position around new car 606, e.g., preferentially at the periphery of or in proximity to new car 606, the advertised product. 'skip' button 608E is to follow an elliptical trajectory around new car 606. To do so, the device may present consecutive composite frames, having each a same precursor frame (e.g., precursor frame of composite frame 602E), and in which the position of 'skip' button 608E satisfies an equation whose graphical representation is an ellipse. This appears as if, in the consecutive composite frames, each content element (e.g., new car 606, background) remain at a same position, except for 'skip' button 608E which follows the elliptical trajectory around new car 606. A first composite frame results from overlaying an interactive element on a first frame of a content item, the first frame being a precursor frame of the first composite frame. The device may present consecutive composite frames, each having a respective precursor frame (e.g., different from the precursor frame of composite frame 602E), and in which the position of 'skip' button 608E satisfies an equation whose graphical representation is an ellipse. This appears as if, in the consecutive composite frames, each content element but, e.g., new car 606 and 'skip' button 608E, remain at a same position. New car 606 moves from left to right and 'skip' button 608E follows the elliptical trajectory around new car 606.

This allows for associating the 'skip' button with a region (e.g., important or salient region) or content element (e.g., important or salient content element) of a frame (e.g., a precursor frame of a composite frame, a composite frame) of a content item, and directing user attention towards the region or content element. This may achieve yet another final impression of the advertised product/before the 'skip' button is invoked. In some instances, a position of a 'skip' button may be linked, via one or more mathematical relationships, to a position of a content element (or region) in a composite frame, that results from overlaying the 'skip' button on a frame (e.g., precursor frame) of a content item. In some instances, the one or more mathematical relationships may comprise, e.g., a distance between a center (e.g., a barycenter) of the 'skip' button and a center (e.g., a barycenter) of the content element and/or an angle value (that may be a real number) between a vertical line and the line passing through the center of the 'skip' button and center of the content element.

In some instances, the position of the 'skip' button in the composite frame may change based on how long the content item has been presented and where the content element is positioned, in the composite frame, the composite frame being associated with a timestamp (or progression point). This may mean that the 'skip' button moves around. The content element may be static across multiple composite frames, but the position of the content element may change across the multiple composite frames. In some instances, the content element associated with the 'skip' button may also be changed from a first content element to a second content element (different from the first content element). In some instances, a content provider may determine a grace period (e.g., timeout) at the end of which the content element has been sufficiently associated with the 'skip' button to be sufficiently exposed to a user's attention. After the grace period, the 'skip' button may be placed to a default position, e.g., lower right corner, in a frame.

Although each of FIGS. 6A to 6E relates to a 'skip' button (e.g., 608A, 608B, 608C, 608D, 608E), the 'skip' button may be replaced by a different type of interactive element, e.g., a 'call to action' button (e.g., 'send to phone' button, 'press OK' button, 'shop now' (or 'buy now' button), etc.), an 'OK' button, a 'x % off' button with 'x' a real number belonging to an open interval between zero and 100, etc. Accordingly, observations related to the 'skip' button in FIGS. 6A to 6E would apply to the different types of interactive elements able to replace the 'skip' button in FIGS. 6A to 6E.

Figure 7A:
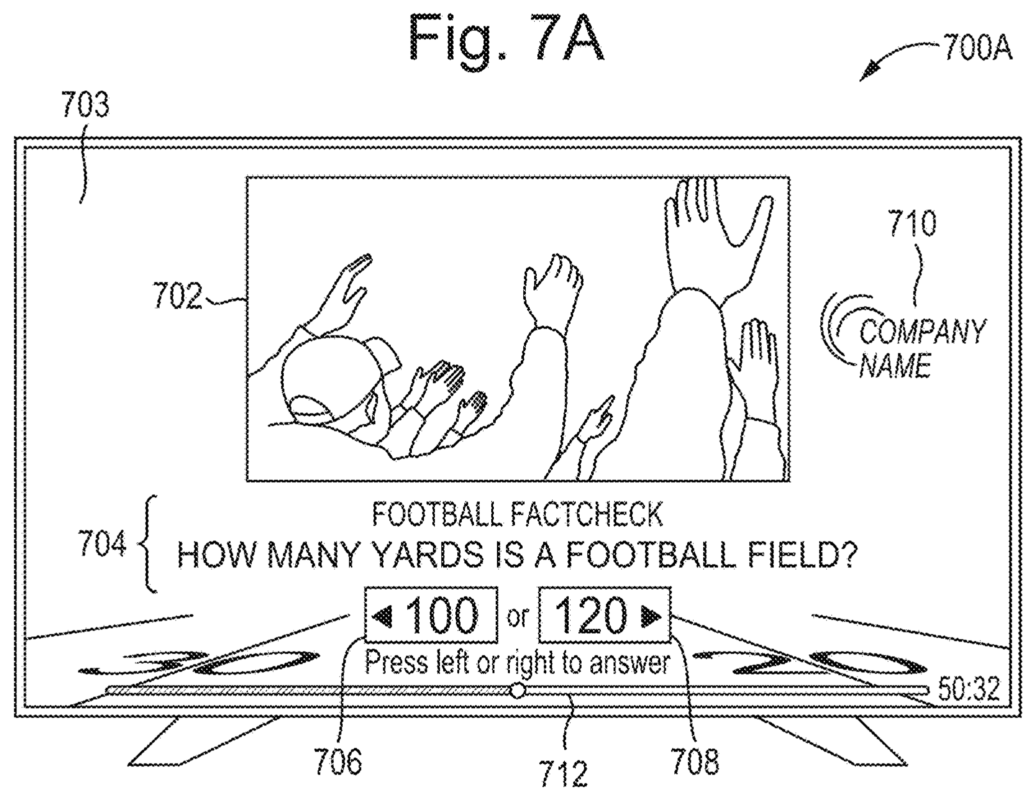
FIGS. 7A-7B show each an example screen for enabling an improved management of a buffer resource of a device during a presentation of a content item, in accordance with some implementations of the disclosure.
Figure 7B:
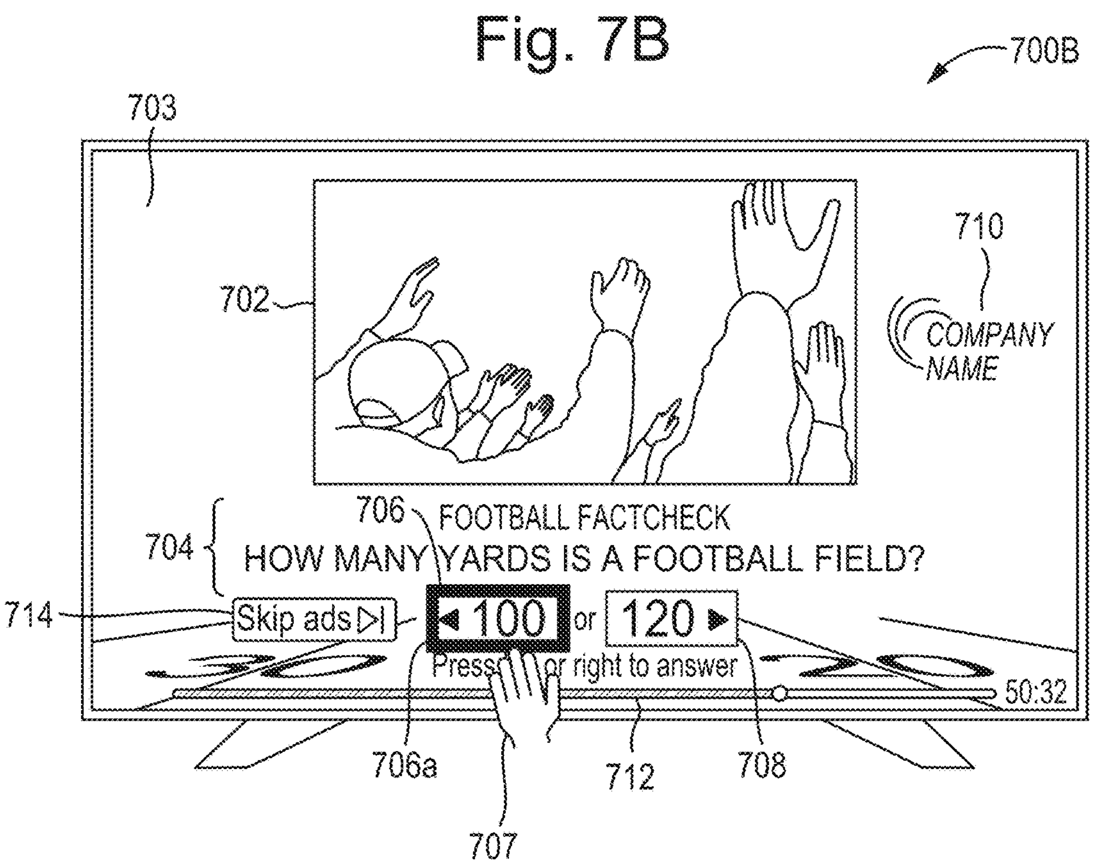

FIGS. 7A-7B show each an example display, e.g., a first screen 700A, second screen 700B, respectively for enabling an improved management of a buffer resource during a presentation of a content item, in accordance with some implementations of the disclosure. In some instances, the device (e.g., a user device, client device) may be in communication, via a communication network (e.g., LAN or WAN), with a server. In some instances, the device may stream or play, from the server, the content item using a player (e.g., a video player). The device may download from the server, and present using the player, the content item. In some instances, the content item may comprise at least one of a movie, a video clip or an ad. In some instances, as shown in FIGS. 7A-7B, the content item is included in first screen 700A and second screen 700B, respectively, as a frame 702, generating a new content item. Some frames of the new content item result from the inclusion of frames 702 into first screen 700A or second screen 700B. In some instances, an interactive element (e.g., 'skip button', etc.) may be overlaid on any part of any frames of the new content item. In some instances, as shown in FIG. 7B, a 'skip' button 714 is positioned, outside of frame 702 of the content item, close to a second text region 706 of the new content item.

First screen 700A comprises frame 702 of the content item and a third screen 703 within which frame 702 is arranged. Third screen 703 comprises, in turn, a first text region 704 (e.g., a question, a poll question, a voting question), the second text region 706 (e.g., a first response), a third text region 708 (e.g., a second response), a logo 710 and a countdown bar 712 determining a timeout after which a response cannot be entered via a user interface input. First text region 704 recites "How many yards is a football field?". Second text region 706 and third text region recite "100 (yards)" and "120 (yards)", respectively.

Second screen 700B is identical to first screen 700A, except for three differences. Second screen 700B comprises a user interface input depicted as a hand 707 (which may appear as an overlay on third screen 703, or may not appear at all), an emphasized outline 706*a* around second text region 706, and the 'skip' button 714. Emphasized outline 706*a* indicates a user selection of second text region 706 (resulting from a receipt of the user interface input) to reply to a question recited in first text region 704. In some instances, visual effects other than emphasized outline 706*a* may occur upon selecting the second text region. The selected second text region 706 may, e.g., for a period of time, blink, be surrounded by fireworks, move back and forth, wobble, etc. 'Skip' button 714 (e.g., in an 'enabled state) appears, after the receipt of the user interface input, as an overlay on screen 703, e.g., at a periphery of (or in proximity to) second text region 706. In some instances, a position of 'skip' button 714 may be modified to improve impressions of the advertised product/service on a user, e.g., by positioning 'skip' button 714 at a periphery of (or in proximity to) logo 710 or a content element of frame 702.

Figure 8:
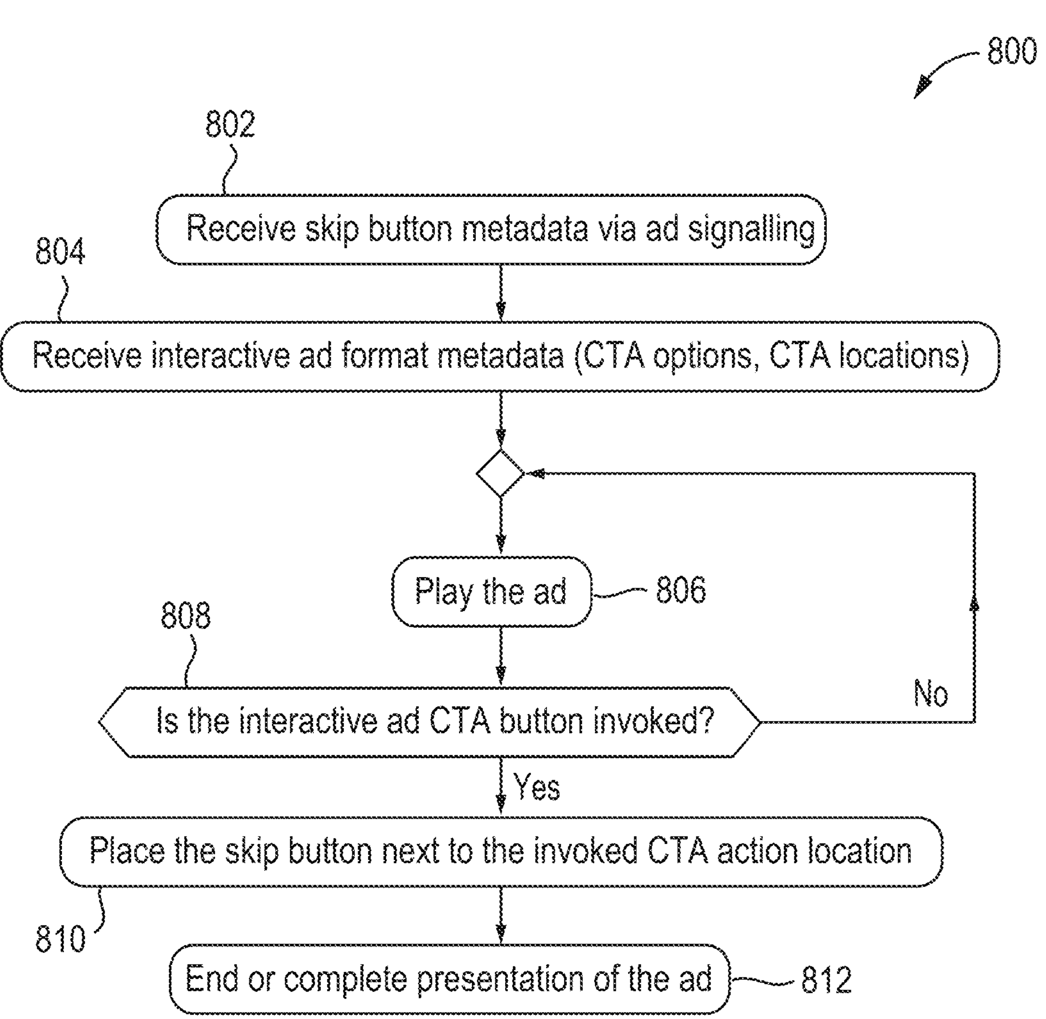
FIG. 8 represents an example flow diagram of illustrative steps involved in enabling an improved management of a buffer resource of a device during a presentation of a content item, in accordance with some implementations of the disclosure.

FIG. 8 represents an example flow diagram 800 of illustrative steps involved in enabling an improved management of a buffer resource of a device during a presentation of a content item, in accordance with some implementations of the disclosure. In some instances, a device (e.g., a user device, client device) may be in communication, via a communication network (e.g., LAN or WAN), with a server. In some instances, the device may stream or play, from the server, the content item using a player (e.g., a video player).

The device may download from the server, and present using the player, the content item. In some instances, the content item may comprise a movie (e.g., an interactive movie), a video clip (e.g., an interactive video clip), or an ad (e.g., an interactive ad). Flow diagram 800 describes, in an ad, how interacting, via a user interface input, with a 'call to action' button causes a 'skip' button to appear at a periphery of or in proximity to the 'call to action' button. Process represented by flow diagram 800 may be implemented, in whole or in part, by any device mentioned throughout the specification (e.g., device 102, devices associated with FIGS. 2, 3, 4, 5, 6A-6E, 7A-7B, 8, 9, 10, 11, 13, and 14). In addition, one or more actions of the process 800 may be incorporated into or combined with one or more actions of any other processes or embodiments described herein. Although process 800 is implemented, for illustration, on an ad, process 800 can and may be applied to any content item (e.g., movie, video clip, etc.) in order to overlay an interactive element on one or more frames of the content item.

At step 802, the device receives, via ad signaling, metadata (e.g., format tuple) associated with a 'skip' button. The device proceeds to step 804.

At step 804, the device receives, via ad signaling, metadata (e.g., format tuple) associated with a 'call to action' button. The device proceeds to step 806.

At step 806, the device presents the ad. The device proceeds to step 808.

At step 808, the device determines whether the 'call to action' button has received a user interface input. If so, the device performs an action associated with the 'call to action' button. If so, the device proceeds to step 810. If not, the device may revert to step 806.

At step 810, the device places the 'skip' button at a periphery of or in proximity to the 'call to action' button. The device proceeds to step 812.

At step 812, the device determines whether the 'skip' button has received a user interface input. If so, the device skips at least a portion, that has not been presented yet, of the ad, and ends the presentation of the ad. If not, the device continues the presentation of the ad up to an end of the ad.

Figure 9:
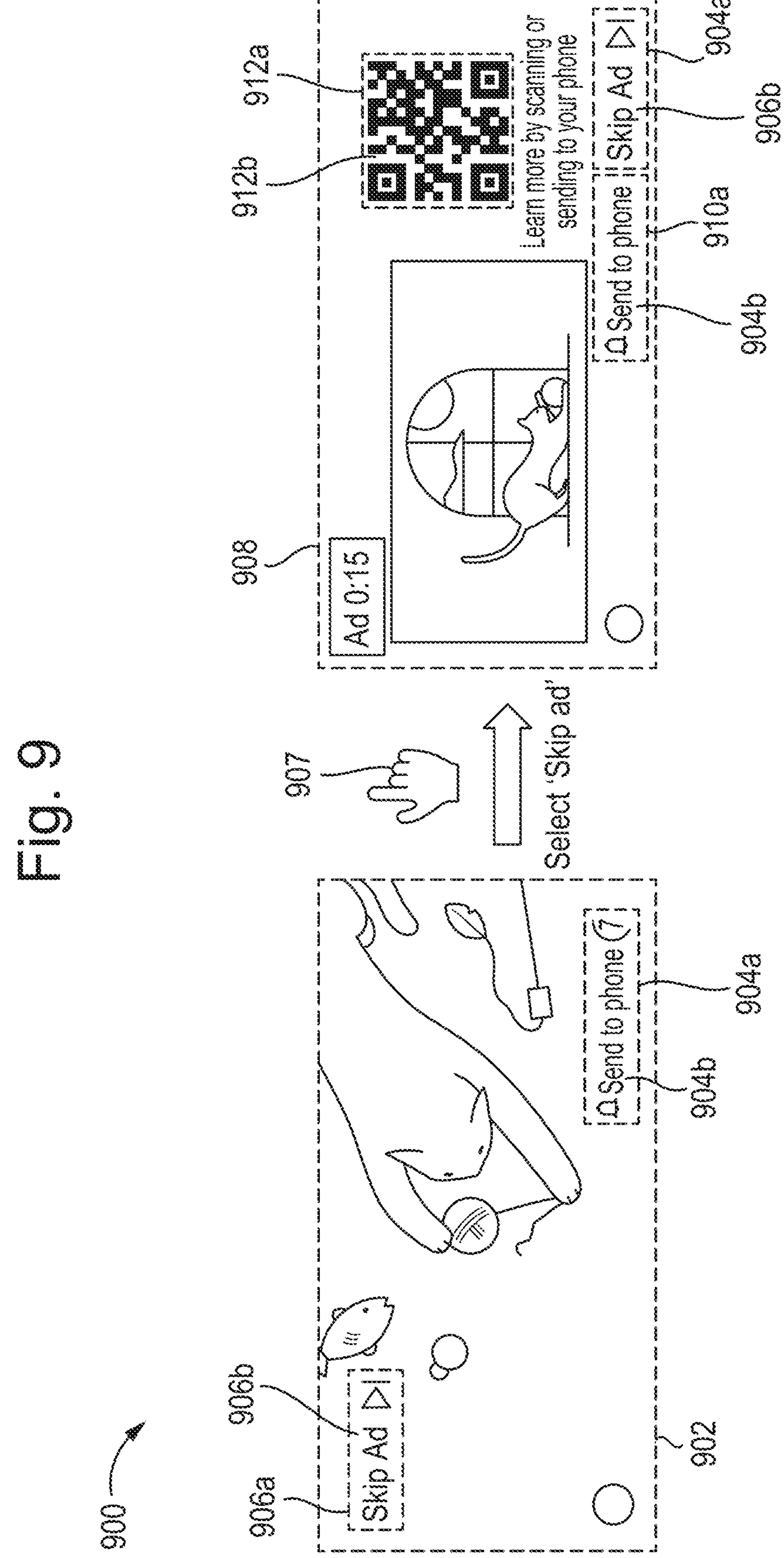
FIG. 9 depicts a content item for enabling an improved management of a buffer resource of a device during a presentation of the content item, in accordance with some implementations of the disclosure.

FIG. 9 depicts a content item 900 (e.g., an example content item) for enabling an improved management of a buffer resource of a device during a presentation of content item 900, in accordance with some implementations of the disclosure. In some instances, a device (e.g., a user device, client device) may be in communication, via a communication network (e.g., LAN or WAN), with a server. In some instances, the device may stream or play, from the server, content item 900 using a player (e.g., a video player). Alternatively, the device may download from the server, and present using the player, content item 900. In some instances, content item 900 may comprise at least one of a movie, a video clip, or an ad. In some instances, as shown in FIG. 9, content item 900 comprises an ad.

Content item 900 advertises products for cats. Content item 900 comprises a frame 902, a frame 908, an arrow in between frame 902 and frame 908 indicating a change in presentation (from frame 902 to frame 908), and resulting from a user interface input depicted as a hand 907. Frame 902 comprises a 'call to action' button (e.g., 'send to phone' button 904*b*) in default position 904*a* (e.g., lower right corner in frame 902), and a 'skip' button 906*b* in position 906*a* (e.g., upper left corner in frame 902). In frame 902, 'skip' button 906*b* does not occupy default position 904*a*. Frame 908 comprises a QR code 912*b* in position 912*a* (e.g., in a middle of right corner in frame 908), 'send to phone' button 904*b* in position 910*a* (e.g., left and adjacent to position 904*a*), and 'skip' button 906*b* in position 904*a*.

In some instances, interacting via a user interface input with 'send to phone' button 904*b* allows for sending, to a portable device (e.g., mobile phone, tablet, laptop), e.g., content item 900 or supplemental content associated with content item 900, information (e.g., website) associated with product or service advertised in content item 900 or the supplemental content in order to be presented, to a user, at a later time on the portable device. In some instances, the user may be prompted to agree, via Terms & Conditions, to consume, on their portable device, one or more content items at a later time in order to have 'send to phone' button 904*b* in an 'enabled' state presented on the one or more content items. In some instances, a sensor (e.g., camera, LIDAR) of the portable device, may be used to determine a position and pose of the user during the presentation, at the later time, of the one or more content items, and whether the user is actively consuming the one or more content items as agreed earlier in the Terms & Conditions. Alternatively or additionally, multiple Wi-Fi signals may be monitored in presence and absence of the user to determine their position and pose relative to the portable device and whether the user is actively consuming the one or more content items as agreed earlier in the Terms& Conditions. Interacting via the user interface input with 'send to phone' button 904*b* also causes presentation of frame 908.

In some instances as depicted in frame 902, while 'skip' button 906*b* is placed at position 906*a* different from default position 904*a*, 'send to phone' button 904*b* occupies default position 904*a*. This may increase the probability, for the user, to interact, via a user interface input, with 'send to phone' button 904*b*. In some instances, in frame 908, when a timer of 'skip' button 906*b* may expire and QR code 912*b* may be displayed, 'send to phone' button 904*b* may be moved to default position 904*a*.

Figure 10:
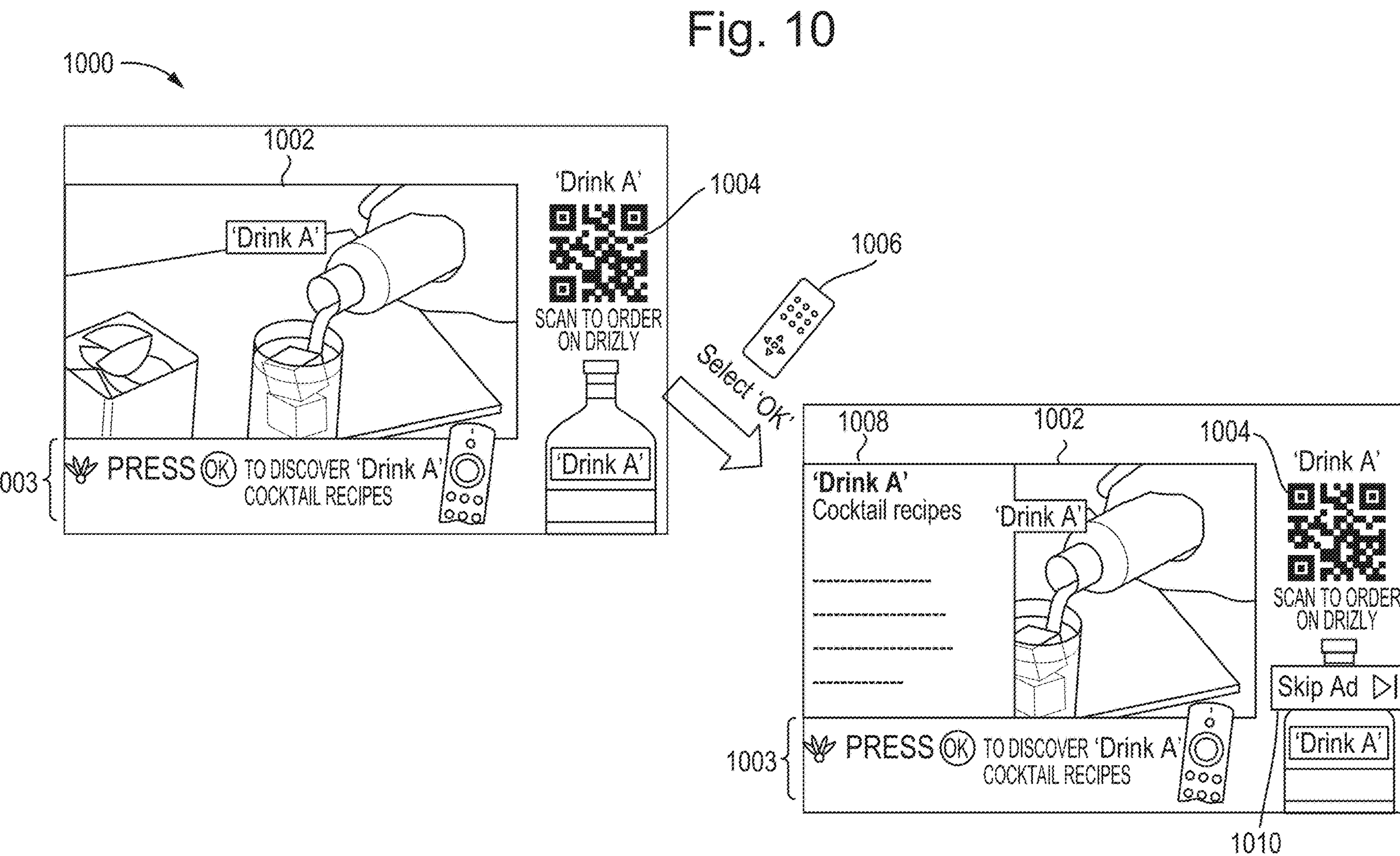
FIG. 10 illustrates a set of example screens for enabling an improved management of a buffer resource of a device during a presentation of a content item, in accordance with some implementations of the disclosure.

FIG. 10 illustrates an example display 1000 (e.g., first screen state, second screen state) for enabling an improved management of a buffer resource of a device during a presentation of a content item, in accordance with some implementations of the disclosure. In some instances, the device (e.g., a user device, client device) may be in communication, via a communication network (e.g., LAN or WAN), with a server. In some instances, the device may stream or play, from the server, the content item using a player (e.g., a video player). The device may download from the server, and present using the player, the content item. In some instances, the content item may comprise at least one of a movie, a video clip or an ad. In some instances, as shown in FIG. 10, the content item comprises an ad. In some instances, as shown in FIG. 10, the content item is included in the first and second screens, as a frame 1002, generating a new content item. Some frames of the new content item result from the inclusion of frames 1002 into the first screen or second screen. In some instances, an interactive element (e.g., 'skip button', etc.) may be overlaid on any part of any frames of the new content item.

Display 1000 advertises a beverage of brand 'Drink A'. The first screen comprises, e.g., a frame 1002, a first text region 1003 (comprising an instruction, e.g., "Press OK to discover 'Drink A' cocktail recipes"), a QR code 1004 and a 'Drink A' branded bottle. After interacting, via a user interface input, with an 'OK' key from a remote control 1006, first screen turns into a second screen. In the second screen, frame 1002 becomes partially overlaid by a second text region 1008 (comprising information associated with the product advertised in the content item, e.g., reciting "'Drink A' cocktail recipes . . . "), and a 'skip' button 1010 appears, outside frame 1002, on the second screen at a periphery of or in proximity to the 'Drink A' branded bottle, more particularly at a periphery of or in proximity to the brand name (e.g., 'Drink A') of the advertised product (e.g., bottle containing 'Drink A'). In some instances, 'skip' button 1010 may present a halo at an outline of 'skip' button 1010. In some instances, the associated information may comprise a link (e.g., a hyperlink) to a webpage associated with the advertised product or service, or the advertised brand, through which an order can be placed.

In some instances, a publisher of the content item may incorporate, into one or more frames of the content item, an interactive element, e.g., a 'call to action' button that calls for an action to be initiated via a user interface input. The 'call to action' button may cause, besides an action disclosed as a text region on the 'call to action' button or appearing on the 'call to action' button when a cursor hovers above the 'call to action' button, one or more actions, such as an appearance of another interactive element, e.g., a 'skip' button. This allows for avoiding a "double click" that would prevent the user from focusing on the content item. The aforementioned observations also apply to FIG. 11.

Figure 11:
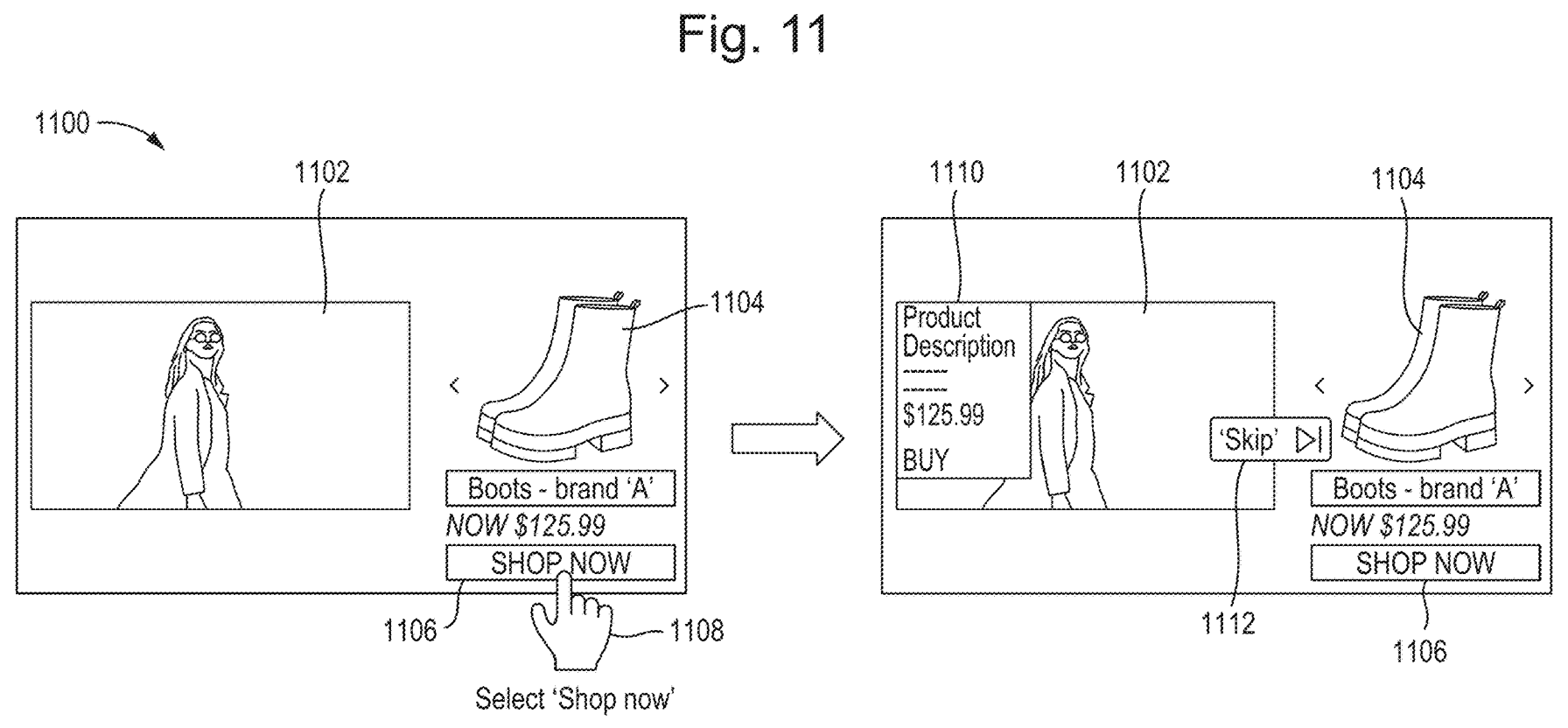

FIG. 11 shows display 1100 (e.g., first screen state, second screen state) for enabling an improved management of a buffer resource of a device during a presentation of a content item, in accordance with some implementations of the disclosure. In some instances, the device (e.g., a user device, client device) may be in communication, via a communication network (e.g., LAN or WAN), with a server. In some instances, the device may stream or play, from the server, the content item using a player (e.g., a video player). The device may download from the server, and present using the player, the content item. In some instances, the content item may comprise at least one of a movie, a video clip or an ad. In some instances, as shown in FIG. 11, the content item comprises an ad. In some instances, as shown in FIG. 11, the content item is included in the first and second screens, as a frame 1102, generating a new content item. Some frames of the new content item result from the inclusion of frames 1102 into the first screen or second screen. In some instances, an interactive element (e.g., 'skip button', etc.) may be overlaid on any part of any frames of the new content item.

Display 1100 advertises a pair of boots of brand 'A'. First screen comprises, e.g., a frame 1102 (surrounded by a banner), a first object 1104 (e.g., a pair of boots of brand 'A' advertised in display 1100), and a first interactive element 1106 (e.g., a 'shop now' button). After interacting, via a user interface input depicted as a hand 1108, with first interactive element 1106, first screen turns into second screen. In the second screen, frame 1102 becomes partially overlaid by a text region 1110 (comprising information associated with the product advertised in display 1100, e.g., "Product description . . . $125.99"), and a second interactive element (e.g., a 'skip' button 1112) appears, on both the banner and frame 1102, at the periphery of or in proximity to both a brand name (e.g., 'A') associated with first object 1104 and first object 1104. In some instances, 'skip' button 1112 may present a halo at an outline of 'skip' button 1112. In some instances, the associated information may comprise a link (e.g., a hyperlink) to a webpage associated with the advertised product or service or the advertised brand, through which an order can be placed.

Figure 12:
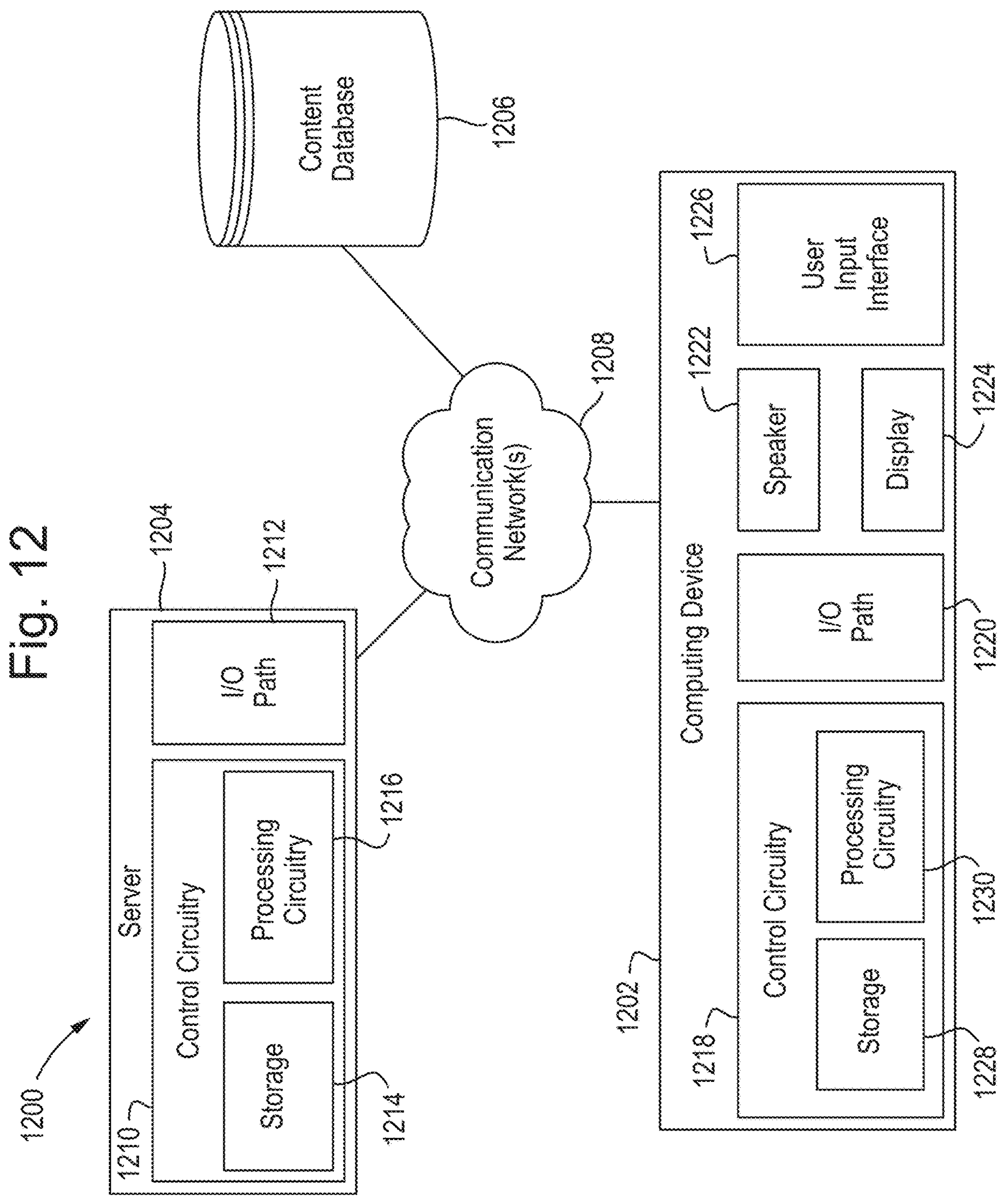
FIG. 12 represents a block diagram showing components of an example system for enabling an improved management of a buffer resource of a device during a presentation of a content item, in accordance with some implementations of the disclosure.

FIG. 12 represents a block diagram showing components of an example system 1200 for enabling an improved management of a buffer resource of a device during a presentation of a content item, in accordance with some implementations of the disclosure. Although FIG. 12 shows system 1200 as including a number and configuration of individual components, in some examples, any number of the components of system 1200 is combined and/or integrated as one device. System 1200 includes computing device 1202 (e.g., device 102, devices associated with FIGS. 2, 3, 4, 5, 6A-6E, 7A-7B, 8, 9, 10, 11, 13, and 14), server 1204 (e.g., servers associated with FIGS. 1, 2, 3, 4, 5, 6A-6E, 7A-7B, 8, 9, 10, 11, 13, and 14), and content database 1206, each of which is communicatively coupled to communication network 1208, which is the Internet or any other suitable network or group of networks. In some examples, system 1200 excludes server 1204, and functionality that would otherwise be implemented by server 1204 is instead implemented by other components of system 1200, such as computing device 1202. In still other examples, server 1204 works in conjunction with computing device 1202 to implement certain functionality described herein in a distributed or cooperative manner.

Server 1204 includes control circuitry 1210 and input/output (I/O) path 1212, and control circuitry 1210 includes storage 1214 and processing circuitry 1216. Computing device 1202, which can be a personal computer, a laptop computer, a tablet computer, a smartphone, a smart television, a smart speaker, or any other type of computing device, includes control circuitry 1218, I/O path 1220, speaker 1222, display 1224, and user input interface 1226, which in some examples provides a user selectable option for enabling and disabling the display of modified closed captions. Control circuitry 1218 includes storage 1228 and processing circuitry 1230. Control circuitry 1210 and/or 1218 is based on any suitable processing circuitry such as processing circuitry 1216 and/or 1230. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and includes a multi-core processor (e.g., dual-core, quad-core, hexa-core, or any suitable number of cores). In some examples, processing circuitry is distributed across multiple separate processors, for example, multiple of the same type of processors (e.g., two Intel Core i9 processors) or multiple different processors (e.g., an Intel Core i7 processor and an Intel Core i9 processor).

Each of storage 1214, storage 1228, and/or storages of other components of system 1200 (e.g., storages of content database 1206, and/or the like) is an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 2D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 1214, storage 1228, and/or storages of other components of system 1200 is used to store various types of content, metadata, and or other types of data. Non-volatile memory also is used (e.g., to launch a boot-up routine and other instructions). Cloud-based storage is used to supplement storages 1214, 1228 or instead of storages 1214, 1228. In some examples, control circuitry 1210 and/or 1218 executes instructions for an application stored in memory (e.g., storage 1214 and/or 1228). Specifically, control circuitry 1210 and/or 1218 is instructed by the application to perform the functions discussed herein. In some implementations, any action performed by control circuitry 1210 and/or 1218 is based on instructions received from the application. For example, the application is implemented as software or a set of executable instructions that is stored in storage 1214 and/or 1228 and executed by control circuitry 1210 and/or 1218. In some examples, the application is a client/server application where only a client application resides on computing device 1202, and a server application resides on server 1204.

The application is implemented using any suitable architecture. For example, it is a stand-alone application wholly implemented on computing device 1202. In such an approach, instructions for the application are stored locally (e.g., in storage 1228), and data for use by the application is downloaded on a periodic basis (e.g., from an out-of-band feed, from an Internet resource, or using another suitable approach). Control circuitry 1218 retrieves instructions for the application from storage 1228 and process the instructions to perform the functionality described herein. Based on the processed instructions, control circuitry 1218 determines what action to perform when input is received from user input interface 1226.

In client/server-based examples, control circuitry 1218 includes communication circuitry suitable for communicating with an application server (e.g., server 1204) or other networks or servers. The instructions for carrying out the functionality described herein are stored on the application server. Communication circuitry includes a cable modem, an Ethernet card, or a wireless modem for communication with other equipment, or any other suitable communication circuitry. Such communication involves the Internet or any other suitable communication networks or paths (e.g., communication network 1208). In another example of a client/server based application, control circuitry 1218 runs a web browser that interprets web pages provided by a remote server (e.g., server 1204). For example, the remote server stores the instructions for the application in a storage device. The remote server processes the stored instructions using circuitry (e.g., control circuitry 1210) and/or generates displays. Computing device 1202 receives the displays generated by the remote server and displays the content of the displays locally via display 1224. This way, the processing of the instructions is performed remotely (e.g., by server 1204) while the resulting displays are provided locally on computing device 1202. Computing device 1202 receives inputs from the user via input interface 1226 and transmits those inputs to the remote server for processing and generating the corresponding displays.

A user sends instructions, e.g., to view an interactive media content item and/or selects one or more programming options of the interactive media content item, to control circuitry 1210 and/or 1218 using user input interface 1226. User input interface 1226 is any suitable user interface, such as a remote control, trackball, keypad, keyboard, touchscreen, touchpad, stylus input, joystick, speech recognition interface, gaming controller, or other user input interfaces. User input interface 1226 is integrated with or combined with display 1224, which can be a monitor, a television, a liquid crystal display (LCD), an electronic ink display, or any other equipment suitable for displaying visual images.

Server 1204 and computing device 1202 transmits and receives content and data via I/O path 1212 and 1220, respectively. For instance, I/O path 1212 and/or I/O path 1220 includes a communication port(s) configured to transmit and/or receive (for instance to and/or from content database 1206), via communication network 1208, content item identifiers, content metadata, natural language queries, and/or other data. Control circuitry 1210, 1218 is used to send and receive commands, requests, and other suitable data using I/O paths 1212, 1220. I/O paths 1212 of server 1200 and I/O paths 1220 of computing device 1202 each comprises I/O circuitry, e.g., network interface, port, bus, wire.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one example may be applied to any other example herein, and flow diagrams or examples relating to one example may be combined with any other example in a suitable manner, done in different orders, or done in parallel. In addition, the systems and methods described herein may be performed in real time or near real time. It should also be noted that the systems and/or methods described above may be applied to, or used in accordance with, other systems and/or methods.

Figure 13:
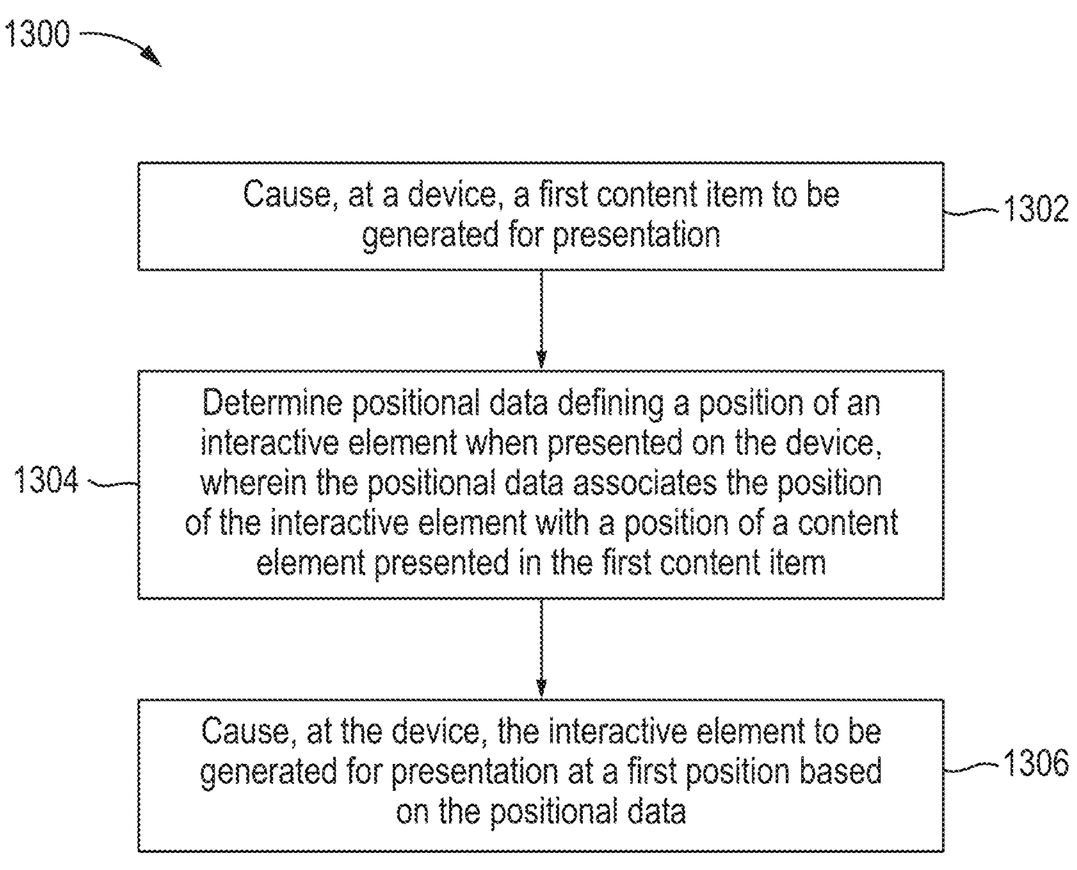
FIG. 13 depicts an example flow diagram of illustrative steps involved in enabling an improved management of a buffer resource during a presentation of a content item, in accordance with some implementations of the disclosure.

FIG. 13 depicts an example flow diagram 1300 of illustrative steps involved in enabling an improved management of a buffer resource of a device during a presentation of a content item, in accordance with some implementations of the disclosure.

In some instances, the device (e.g., a user device, client device) may be in communication, via a communication network (e.g., LAN or WAN), with a server. In some instances, the device may stream or play, from the server, a content item using a player (e.g., a video player). Alternatively, the device may download from the server, and present using the player, the content item. In some instances, the content item may comprise at least one of a movie, a video clip or an ad. Process represented by flow diagram 1300 may be implemented, in whole or in part, by any device mentioned throughout the specification (e.g., device 102, server associated with FIG. 1, devices and servers associated with FIGS. 2, 3, 4, 5, 6A-6E, 7A-7B, 8, 9, 10, 11, 13, and 14). In addition, one or more actions of the process 1300 may be incorporated into or combined with one or more actions of any other processes or embodiments described herein.

At step 1302, control circuitry of the server (or device) causes, at the device, a first content item to be generated for presentation. The control circuitry of the server (or device) proceeds to step 1304.

At step 1304, the control circuitry of the server (or device) determines positional data defining a position of an interactive element when presented on the device, wherein the positional data associates the position of the interactive element with a position of a content element presented in the first content item. The control circuitry of the server (or device) proceeds to step 1306.

At step 1306, the control circuitry of the server (or device) causes, at the device, the interactive element to be generated for presentation at a first position based on the positional data.

FIG. 14 illustrates an example flow diagram 1400 of illustrative steps involved in enabling an improved management of a buffer resource of a device during a presentation of a content item, in accordance with some implementations of the disclosure. In some instances, the device (e.g., a user device, client device) may be in communication, via a communication network (e.g., LAN or WAN), with a server. In some instances, the device may stream or play, from the server, a content item using a player (e.g., a video player). The device may download from the server, and present, using the player, the content item. In some instances, the content item may comprise at least one of a movie, a video clip or an ad. Process represented by flow diagram 1400 may be implemented, in whole or in part, by any device mentioned throughout the specification (e.g., device 102, server associated with FIG. 1, devices and servers associated with FIGS. 2, 3, 4, 5, 6A-6E, 7A-7B, 8, 9, 10, 11, 13, and 14). In addition, one or more actions of the process 1400 may be incorporated into or combined with one or more actions of any other processes or embodiments described herein.

At step 1402, control circuitry of the server (or device) selects for presentation, at the device, a first content item, wherein the first content item comprises a set of frames. The control circuitry of the server (or device) proceeds to step 1404.

At step 1404, the control circuitry of the server (or device) determines saliency of a first subset of the set of frames of the first content item, wherein the saliency comprises at least one of visual saliency, semantic saliency, or brand saliency. In some instances, the control circuitry of the server (or device) may determine a saliency score associated with one or more pixels of a frame of the first subset of the set of frames, wherein the saliency score comprises at least one of a visual saliency score, semantic saliency score, or brand saliency score. The control circuitry of the server (or device) proceeds to step 1406.

At step 1406, the control circuitry of the server (or device) determines, for one or more frames of the first subset, a saliency map based on the determined saliency, wherein each saliency map is based on saliency scores associated with pixels of a frame of the one or more frames of the first subset. The control circuitry of the server (or device) proceeds to step 1408. In some instances, the control circuitry of the server (or device) may proceed to step 1448.

At step 1408, the control circuitry of the server (or device) determines, in a first saliency map associated with a first frame of the first subset, a first region having a first saliency score above a threshold saliency score, e.g., determined based on user settings/preferences of a user or a plurality of users, and/or settings/preferences from a content provider, owner or publisher. The control circuitry of the server (or device) proceeds to step 1410.

At step 1410, the control circuitry of the server (or device) associates the first region with a position of a content element presented in first frame of the first subset. The control circuitry of the server (or device) proceeds to step 1412.

At step 1412, the control circuitry of the server (or device) associates one or more positions of an interactive element with a periphery of the first region of the first saliency map. The one or more positions may amount to a first number of positions. The control circuitry of the server (or device) proceeds to step 1414.

At step 1414, the control circuitry of the server (or device) associates each of the one or more positions of the interactive element with a respective timing instruction (e.g., a time point or place in a time sequence of the one or more positions), and/or a 'disabled' or 'enabled' state of the interactive element. The control circuitry of the server (or device) proceeds to step 1416.

At step 1416, the control circuitry of the server (or device) generates for presentation one or more first composite frames (e.g., associated with the first frame). The one or more first composite frames amounts to a second number of composite frames, wherein the second number is equal (in value) to the first number. In some instances, each first composite frame is generated by overlaying the interactive element, on the first frame of the first subset, at a respective position (of the one or more positions) such that a timestamp (or progression point) of the first composite frame is based on a respective timing instruction associated with the respective position. In such instances, the interactive element may move across frames (depending on the one or more positions) while any content element of the first frame remains fixed. In some instances, each first composite frame is generated by overlaying the interactive element, on a frame of a second subset of the set of frames of the first content item, at a position (of the one or more positions) such that a timestamp (or progression point) associated with the first composite frame corresponds to a timestamp (or progression point) associated with the frame of the second subset. The second subset of the set of frames may be a timestamp- or progression point-based sequence of frames, comprising the first frame. For example, the interactive element may be overlaid on the first frame at a first position selected from the one or more positions. For example, the interactive element may be overlaid, on a second frame of the second subset of the set of frames, directly adjacent to the first frame, at a second position of the one or more positions such that the second position is directly adjacent, in terms of time point or place in a time sequence of the one or more positions, to the first position. For example, the interactive element may be overlaid, on a third frame of the second subset of the set of frames, adjacent to the first frame, at a third position of the one or more positions such that the third position is adjacent, in terms of time point or place in a time sequence of the one or more positions, to the first position and directly adjacent to the second position. The first, second and third frames are different from one another, and the first, second, and third positions may differ at least in timing instruction (e.g., time point, or place in a time sequence of the one or more positions). In such instances, the interactive element and any content element of the second subset of frames may move across the second subset of frames. The control circuitry of the server (or device) proceeds to step 1418.

At step 1418, the control circuitry of the server (or device) causes, at the device, presentation of a first composite frame. The control circuitry of the server (or device) may cause, at the device, presentation of multiple composite frames comprising the matrix code, if the control circuitry of the server (or device) has already proceeded through steps 1448, 1450, 1452. The control circuitry of the server (or device) proceeds to step 1420.

At step 1420, the control circuitry of the server (or device) determines whether the interactive element is in a disabled state in the first composite frame. If so, the control circuitry of the server (or device) proceeds to step 1438. If not, the control circuitry of the server (or device) proceeds to step 1422.

At step 1422, the control circuitry of the server (or device) determines whether an input (e.g., a user interface input) to the interactive element has been received. If so, the control circuitry of the server (or device) proceeds to step 1424. If not, the control circuitry of the server (or device) proceeds to step 1432.

At step 1424, the control circuitry of the server (or device) causes, at the device, to perform an action associated with the interactive element. The control circuitry of the server (or device) proceeds to one of steps 1426, 1434 or 1436. In some instances, the control circuitry of the server (or device) may proceed to steps 1426, 1434, and/or 1436, if the input to the interactive element causes the control circuitry of the server (or device) to perform, at the device, one or more actions simultaneously or sequentially.

At step 1426, the control circuitry of the server (or device) causes another interactive element to be generated for presentation on a composite frame consecutive (e.g., directly consecutive) to the first composite frame. The control circuitry of the server (or device) proceeds to step 1428.

At step 1428, the control circuitry of the server (or device) determines whether the performed action affects the presentation of the first content item. If so, the control circuitry of the server (or device) proceeds to step 1430. If not, the control circuitry of the server (or device) proceeds to step 1432.

At step 1430, the control circuitry of the server (or device) causes, at the device, the presentation of the first content item to be modified in accordance with the performed action. The device proceeds from step 1430 to a path determined by a nature of the performed action. In some instances, when the control circuitry of the server (or device) proceeds from step 1426 through step 1428 to step 1430, the control circuitry of the server (or device) regenerates for presentation another composite frame (into a second composite frame) consecutive (e.g., directly consecutive) to the first composite frame to present the other interactive element. The control circuitry of the server (or device) reverts to step 1432.

In some instances, when the control circuitry of the server (or device) proceeds from step 1434 through step 1428 to step 1430, the control circuitry of the server (or device) causes, at the device, presentation of a second content item or a supplemental content item. In some instances, the supplemental content item is derived from the first content item, and comprises, using GANs, one or more content elements from frames of the first subset, that are associated with first regions having each a saliency score above the threshold saliency score. The one or more content elements may be important, salient or of interest. The control circuitry of the server (or device) may end the presentation of the first content item by presenting the supplemental content item. The control circuitry of the server (or device) reverts to step 1402, e.g., for presenting a second content item. In some instances, the second content item is not be derived from the first content item, as in the case of an ad pod. The control circuitry of the server (or device) scales down the first content item to an 'L'-shaped banner or ribbon representing at least a portion of a static frame of the first content item, while the control circuitry of the server (or device) presents the second content item in a lower portion of an initial area (of a device display) used for presenting the first content item, before the first content item becomes presented as the 'L'-shaped banner or ribbon. The control circuitry of the server (or device) may end the presentation of the first content item if the 'L'-shaped banner or ribbon associated with the first content item is not interacted with via a user interface input. The control circuitry of the server (or device) reverts to step 1402, e.g., for presenting the second content item.

In some instances, when the control circuitry of the server (or device) proceeds from step 1436 through step 1428 to step 1430, the control circuitry of the server (or device) causes the first content item to be skipped, ends the presentation of the first content item and reverts to step 1402, e.g., for presenting the second content item. Depending on the action considered by taking into account one of steps 1426, 1434, 1436, and possible variations when considering a single action, the control circuitry of the server (or device) may revert from step 1430 (through 'C') to step 1402, or proceed from step 1430 to step 1432. Accordingly, in FIG. 14, there is a dashed line oriented from step 1430 (through 'C') to 1402, and from step 1430 to step 1432, the dashed line expressing the uncertainty about which of the two scenarios occurs.

At step 1432, the control circuitry of the server (or device) continues, at the device, the presentation of the first content item. The control circuitry of the server (or device) reverts to step 1416.

At step 1434, the control circuitry of the server (or device) causes, at the device, presentation of the second content item or supplemental content. The control circuitry of the server (or device) proceeds to step 1428.

At step 1436, the control circuitry of the server (or device) causes, at the device, the first content item to be skipped. The control circuitry of the server (or device) proceeds to step 1428.

At step 1438, the control circuitry of the server (or device) determines whether the interactive element has a countdown timer indicating a period during which the interactive element is in the 'disabled' state. If so, the control circuitry of the server (or device) proceeds to step 1440. If not, the control circuitry of the server (or device) proceeds to step 1444.

At step 1440, the control circuitry of the server (or device) determines, using a sensor (e.g., camera, LIDAR, eye tracking sensor, changes of Wi-Fi signals in presence and absence of a user and depending on the user's position and pose), whether there is a lack of user engagement during a portion of the countdown corresponding to the period during which the interactive element is in the 'disabled' state. If so, the control circuitry of the server (or device) proceeds to step 1442. If not, the control circuitry of the server (or device) proceeds to step 1432.

At step 1442, the control circuitry of the server (or device) extends the countdown. The control circuitry of the server (or device) reverts to step 1438.

At step 1444, the control circuitry of the server (or device) determines whether an input (e.g., a user interface input) to the interactive element has been received. If so, the control circuitry of the server (or device) proceeds to step 1446. If not, the control circuitry of the server (or device) proceeds to step 1432.

At step 1446, the control circuitry of the server (or device) regenerates for presentation another first composite frame (into a second composite frame) consecutive (e.g., directly consecutive) to the first composite frame, wherein the interactive element is moved from a first position to a second position. The control circuitry of the server (or device) proceeds to step 1432.

At step 1448, the control circuitry of the server (or device) determines, in multiple saliency maps associated with one or more consecutive frames of the first subset, a same second region having a second saliency score above a threshold saliency score, wherein the second region is different from the first region. In some instances, the second saliency score may be below the first saliency score. In some instances, the control circuitry of the server (or device) may associate the second region with a position of a second content element presented in the one or more consecutive frames of the first subset. In some instances, the control circuitry of the server (or device) may proceed to step 1450.

At step 1450, the control circuitry of the server (or device) associates a position of a matrix code (e.g., a QR code) with the second region, e.g., at the periphery of or in proximity to the second region. This may allow for directing the user's attention from the second region towards the matrix code. In some instances, the control circuitry of the server (or device) may proceed to step 1452.

At step 1452, the control circuitry of the server (or device) generates for presentation of multiple composite frames comprising the matrix code. In some instances, the control circuitry of the server (or device) may proceed to step 1408.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one example may be applied to any other example herein, and flow diagrams or examples relating to one example may be combined with any other example in a suitable manner, done in different orders, or done in parallel. In addition, the systems and methods described herein may be performed in real time or near real time. It should also be noted that the systems and/or methods described above may be applied to, or used in accordance with, other systems and/or methods.

What is claimed is:

1. A method for providing an interactive element, the method comprising:

causing, at a device, a first content item to be generated for presentation;

determining positional data defining a position of an interactive element when presented on the device, wherein the positional data associates the position of the interactive element with a position of a content element presented in the first content item;

causing, at the device, the interactive element to be generated for presentation at a first position based on the positional data;

causing the interactive element to be inactive for a period;

receiving an input to the interactive element during the period; and causing the interactive element to be generated for presentation at a second position based on the positional data, in response to receiving the input to the interactive element during the period.

2. The method according to claim 1, wherein the positional data defines multiple positions of the interactive element when presented on the device, the method further comprising:

receiving, at the device, timing instructions associated with each of the multiple positions; and causing update of the presented position of the interactive element based on the positional data and the timing instructions.

3. The method according to claim 1, wherein the determining the positional data comprises:

determining a saliency map of the first content item;

associating a first region of the saliency map with the position of the content element presented in the first content item; and associating the position of the interactive element with a periphery of the first region of the saliency map.

4. The method according to claim 3, wherein the determining the saliency map comprises:

determining a visual saliency of the first content item; and determining a semantic saliency of the first content item.

5. The method according to claim 3, the method further comprising:

determining a second region of the saliency map having a saliency score above a threshold saliency score over a duration of the presentation of the first content item; and causing presentation, at a position associated with the second region, of a matrix code.

6. The method according to claim 1, wherein the input is a first input, the method further comprising:

receiving a second input to the interactive element; and causing presentation on the device, in response to receiving the second input, of supplemental content, wherein the supplemental content is derived from the first content item presented on the device.

7. The method according to claim 1, wherein the input is a first input, the method further comprising:

receiving a second input to the interactive element; and causing presentation on the device of a second content item in response to receiving the second input to the interactive element, wherein the second content item is presented in a modified format and concurrently with at least a portion of the first content item.

8. The method according to claim 1, wherein the input is a first input, the method comprising:

generating for presentation, at the device, another interactive element during the presentation of the first content item;

receiving a second input to the other interactive element; and causing the interactive element to be generated for presentation in response to receiving the second input to the other interactive element.

9. A system for providing an interactive element, the system comprising:

control circuitry configured to:

cause, at a device, a first content item to be generated for presentation; determine positional data defining a position of an interactive element when presented on the device, wherein the positional data associates the position of the interactive element with a position of a content element presented in the first content item; and cause, at the device, the interactive element to be generated for presentation at a first position based on the positional data;

cause the interactive element to be inactive for a period;

receive an input to the interactive element during the period; and cause the interactive element to be generated for presentation at a second position based on the positional data, in response to receiving the input to the interactive element during the period.

10. The system according to claim 9, wherein:

the positional data defines multiple positions of the interactive element when presented on the device;

the control circuitry is further configured to:

receive, at the device, via an input/output circuitry, timing instructions associated with each of the multiple positions; and cause update of the presented position of the interactive element based on the positional data and the timing instructions.

11. The system according to claim 9, wherein the control circuitry is further configured to determine the positional data by:

determining a saliency map of the first content item;

associating a first region of the saliency map with the position of the content element presented in the first content item; and associating the position of the interactive element with a periphery of the first region of the saliency map.

12. The system according to claim 11, wherein the control circuitry is further configured to determine the saliency map by:

determining a visual saliency of the first content item; and determining a semantic saliency of the first content item.

13. The system according to claim 11, wherein the control circuitry is further configured to:

determine a second region of the saliency map having a saliency score above a threshold saliency score over a duration of the presentation of the first content item; and cause presentation, at a position associated with the second region, of a matrix code.

14. The system according to claim 9, wherein the input is a first input, and wherein the control circuitry is further configured to:

receive a second input to the interactive element; and cause presentation on the device, in response to receiving the second input, of supplemental content, wherein the supplemental content is derived from the first content item presented on the device.

15. The system according to claim 9, wherein the input is a first input, and wherein the control circuitry is further configured to:

receive a second input to the interactive element; and cause presentation on the device of a second content item in response to receiving the second input to the interactive element, wherein the second content item is presented in a modified format and concurrently with at least a portion of the first content item.

16. The system according to claim 9, wherein the control circuitry is further configured to:

determine a lack of user engagement with the presentation of the first content item during the period; and extend the period based on the lack of user engagement.

17. The system according to claim 9, wherein the input is a first input, and wherein the control circuitry is further configured to:

generate for presentation, at the device, another interactive element during the presentation of the first content item;

receive a second input to the other interactive element; and cause the interactive element to be generated for presentation in response to receiving the second input to the other interactive element.

18. A method comprising:

causing, at a device, a first content item to be generated for presentation;

determining positional data defining a position of an interactive element when presented on the device, wherein the positional data associates the position of the interactive element with a position of a content element presented in the first content item;

causing, at the device, the interactive element to be generated for presentation at a first position based on the positional data;

causing the interactive element to be inactive for a period;

determining a lack of user engagement with the presentation of the first content item during the period; and extending the period based on the lack of user engagement.

* * * * *